US009691231B2

(12) United States Patent
Fujisawa et al.

(10) Patent No.: US 9,691,231 B2
(45) Date of Patent: Jun. 27, 2017

(54) GAMING MACHINE WITH BLANK SYMBOL-BASED AWARD

(71) Applicants: Universal Entertainment Corporation, Koto-ku, Tokyo (JP); Aruze Gaming America, Inc., Las Vegas, NV (US)

(72) Inventors: Masumi Fujisawa, Tokyo (JP); Kenta Kitamura, Tokyo (JP); Hiroki Saito, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 121 days.

(21) Appl. No.: 14/280,640

(22) Filed: May 18, 2014

(65) Prior Publication Data

US 2014/0349735 A1 Nov. 27, 2014

(30) Foreign Application Priority Data

May 22, 2013 (JP) ................................ 2013-108425

(51) Int. Cl.
*A63F 13/00* (2014.01)
*G07F 17/34* (2006.01)
*G07F 17/32* (2006.01)

(52) U.S. Cl.
CPC ............ *G07F 17/34* (2013.01); *G07F 17/326* (2013.01)

(58) Field of Classification Search
None
See application file for complete search history.

(56) References Cited

U.S. PATENT DOCUMENTS

2004/0242314 A1* 12/2004 Casey ..................... G07F 17/32 463/20
2007/0060245 A1* 3/2007 Veenker .................. G07F 17/32 463/16
2009/0124335 A1* 5/2009 Watkins .................. G07F 17/32 463/20
2009/0227323 A1* 9/2009 Saito ....................... G07F 17/34 463/20
2010/0105468 A1* 4/2010 Sugano ................... G07F 17/32 463/25
2011/0111826 A1* 5/2011 Baerlocher ......... G07F 17/3244 463/20
2011/0250947 A1 10/2011 Okamoto
2014/0274281 A1* 9/2014 Jaffe ....................... G07F 17/34 463/20

* cited by examiner

*Primary Examiner* — Jason Yen
(74) *Attorney, Agent, or Firm* — KMF Patent Services, PLLC; Kenneth M. Fagin; S. Peter Konzel

(57) ABSTRACT

Probability of prize occurrence is easily controlled without provision of a blank between symbols on a reel. A gaming machine 300 includes a lower image display panel 141 configured to variable-display symbol arrays 170 each including a plurality of normal symbols 501 and a plurality of crest symbols 502 arranged among the normal symbols 501, and then rearrange the normal symbols 501 and the blank symbols 502 in a symbol display region 150 having a matrix of cells. The gaming machine 300 generates a line win or a scatter win when the normal symbols 501 are rearranged on the lower image display panel 141 in a predetermined manner, and generates a crest win which is lower than the line win and the scatter win when a predetermined number or more of the crest symbols 502 are rearranged.

2 Claims, 36 Drawing Sheets

FIG.28

| REMAINING COUNT NUMBER | SECOND BY WHICH INCREMENT FOR ONE COUNT IS CARRIED OUT |
|---|---|
| 1～2 | ABOUT 2.10 SECONDS |
| 3 | ABOUT 1.70 SECONDS |
| 4 | ABOUT 1.30 SECONDS |
| 5 | ABOUT 1.20 SECONDS |
| 6～7 | ABOUT 1.00 SECONDS |
| 8～9 | ABOUT 0.80 SECONDS |
| 10～11 | ABOUT 0.70 SECONDS |
| 12 | ABOUT 0.60 SECONDS |
| 13～17 | ABOUT 0.50 SECONDS |
| 18～23 | ABOUT 0.40 SECONDS |
| 24～30 | ABOUT 0.30 SECONDS |
| 31～45 | ABOUT 0.24 SECONDS |
| 46～50 | ABOUT 0.18 SECONDS |
| 51～80 | ABOUT 0.16 SECONDS |
| 81～100 | ABOUT 0.13 SECONDS |
| 101 OR HIGHER | REWRITE |

FIG.29

| THRESHOLD | SECONDS |
|---|---|
| DECIMAL ODDS OF 1 OR LOWER | 0.5 SECOND |
| DECIMAL ODDS OF 1 TO LESS THAN 1.5 | 1 SECOND |
| DECIMAL ODDS OF 1.5 TO LESS THAN 2.5 | 2 SECONDS |
| DECIMAL ODDS OF 2.5 TO LESS THAN 3.5 | 3 SECONDS |
| DECIMAL ODDS OF 3.5 TO LESS THAN 4.5 | 4 SECONDS |
| DECIMAL ODDS OF 4.5 TO LESS THAN 5.5 | 5 SECONDS |
| DECIMAL ODDS OF 5.5 TO LESS THAN 6.5 | 6 SECONDS |
| DECIMAL ODDS OF 6.5 TO LESS THAN 7.5 | 7 SECONDS |
| DECIMAL ODDS OF 7.5 TO LESS THAN 8.5 | 8 SECONDS |
| DECIMAL ODDS OF 8.5 TO LESS THAN 9.5 | 9 SECONDS |
| DECIMAL ODDS OF 9.5 TO LESS THAN 10.5 | 10 SECONDS |
| DECIMAL ODDS OF 10.5 TO LESS THAN 11.5 | 11 SECONDS |
| DECIMAL ODDS OF 11.5 TO LESS THAN 12.5 | 12 SECONDS |
| DECIMAL ODDS OF 12.5 TO LESS THAN 13.5 | 13 SECONDS |
| DECIMAL ODDS OF 13.5 TO LESS THAN 14.5 | 14 SECONDS |
| DECIMAL ODDS OF 14.5 TO LESS THAN 15.5 | 15 SECONDS |
| DECIMAL ODDS OF 15.5 TO LESS THAN 16.5 | 16 SECONDS |
| DECIMAL ODDS OF 16.5 TO LESS THAN 17.5 | 17 SECONDS |
| DECIMAL ODDS OF 17.5 TO LESS THAN 18.5 | 18 SECONDS |
| DECIMAL ODDS OF 18.5 TO LESS THAN 19.5 | 19 SECONDS |
| DECIMAL ODDS OF 19.5 TO LESS THAN 20.5 | 20 SECONDS |
| DECIMAL ODDS OF 20.5 TO LESS THAN 21.5 | 21 SECONDS |
| DECIMAL ODDS OF 21.5 TO LESS THAN 22.5 | 22 SECONDS |
| DECIMAL ODDS OF 22.5 TO LESS THAN 23.5 | 23 SECONDS |
| DECIMAL ODDS OF 23.5 TO LESS THAN 24.5 | 24 SECONDS |
| DECIMAL ODDS OF 24.5 TO LESS THAN 25 | 25 SECONDS |
| DECIMAL ODDS OF 25 TO LESS THAN 50 | 30 SECONDS |
| DECIMAL ODDS OF 50 OR HIGHER | 35 SECONDS |

BUTTON LAYOUT

FIG.33
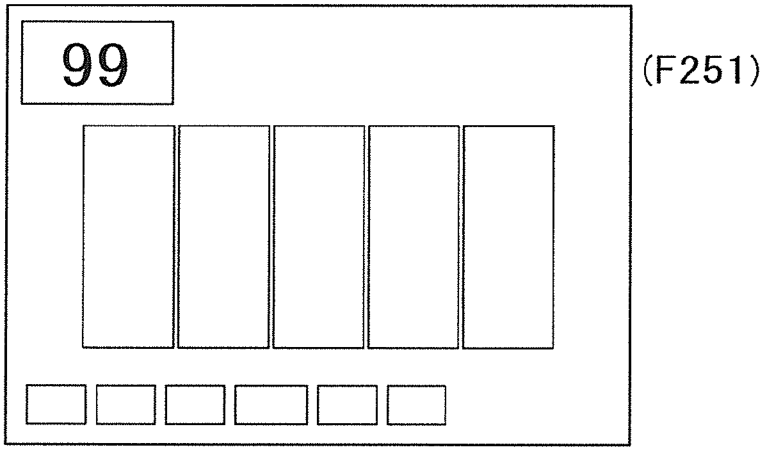
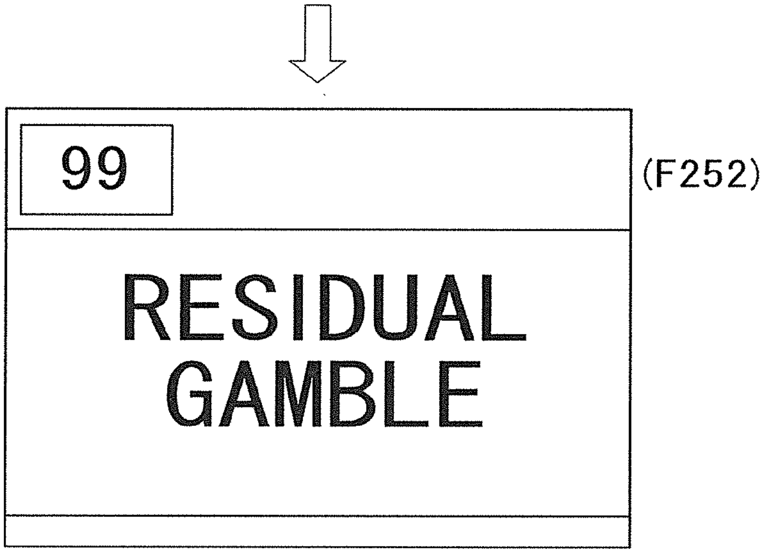
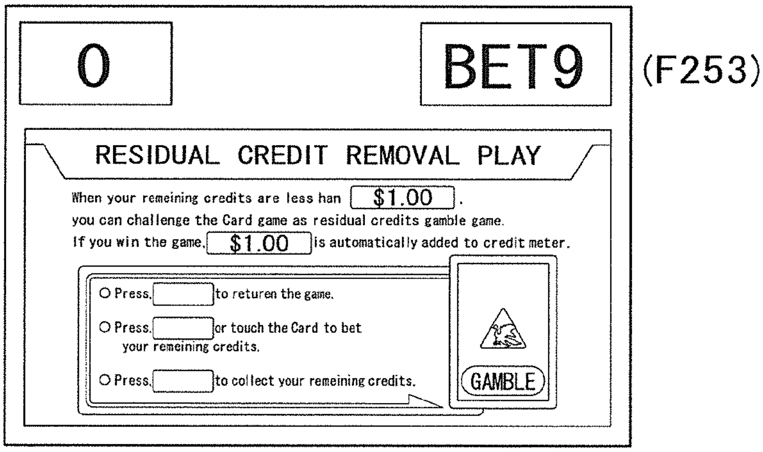

FIG.36
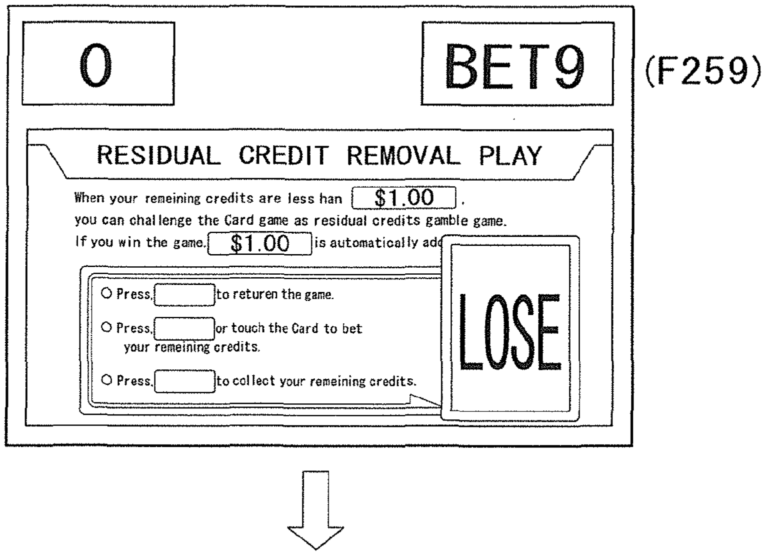
(F259)
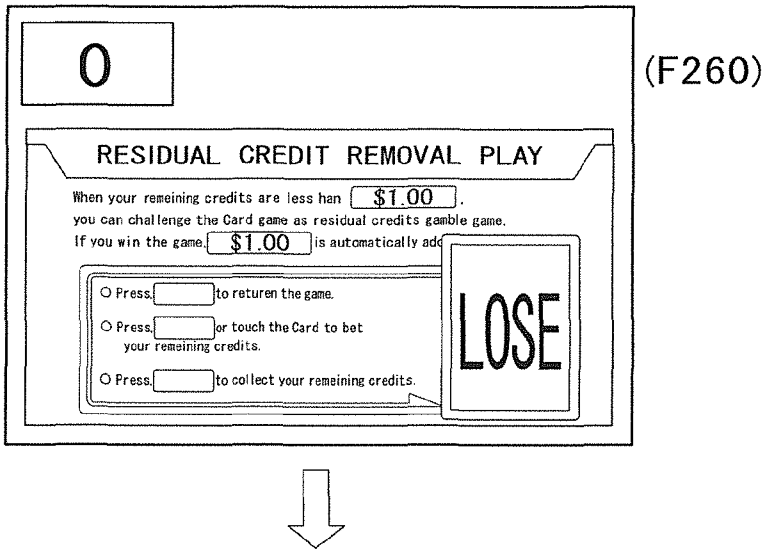
(F260)
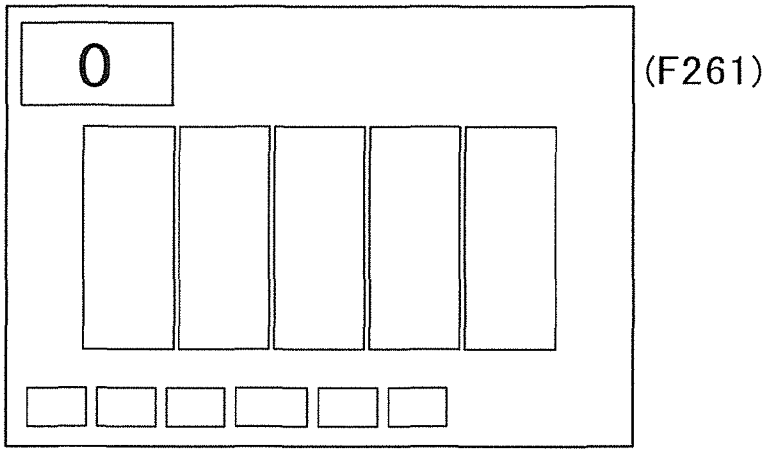
(F261)

GAMING MACHINE WITH BLANK SYMBOL-BASED AWARD

CROSS REFERENCE TO RELATED APPLICATION

The present application claims priority from Japanese Patent Application No. 2013-108425, which was filed on May 22, 2013, the disclosure of which is herein incorporated by reference in its entirety.

BACKGROUND OF THE INVENTION

1. Field of the Invention

The present invention relates to a gaming machine in which symbols are rearranged after being variably displayed.

2. Description of Related Art

An example of a known slot machine is disclosed by U.S. Laid-Open Patent Application No. 2011/0250947. This slot machine is set up in a gaming arcade or the like, and operates in such a way that, when a player inserts a coin, bill or the like into an insertion slot of a slot machine and presses a spin button, symbols are scroll-displayed on a symbol display area provided on the front surface of a cabinet, and then the symbols are automatically stopped. Based on the state of the stopped symbols, various prizes such as a bonus are established. In the gaming machine represented by such a known slot machine, mechanical reels or video reels having symbols are rotate displayed. Typically, in a case where symbols stopped in matrix in a symbol display area form a predetermined combination, or in a case where a predetermined number of symbols or more are displayed, various prizes such as a bonus occurs.

In some cases, there is a known gaming machine in which a space is provided between symbols on the reels. This reduces the number of symbols to be stopped in the symbol display area, which contributes to a decrease in the probability of prize occurrence. Provision of a space between symbols therefore is advantageous in controlling the probability of prize occurrence in the gaming machine. However, it has been a concern that players may understand that such a gaming machine whose reels have spaces has a lower probability of prize occurrence as compared with other gaming machines, and that the players therefore may avoid such a gaming machine. Further, in terms of laws, there is a probability that provision of a space between symbols on a reel could face a regulation.

In view of the above problem, it is an object of the present invention to provide a gaming machine facilitating control of the probability of prize occurrence without a need of provision of a space between symbols on a reel.

SUMMARY OF THE INVENTION

An aspect of the present invention is a gaming machine including: a symbol display device configured to variable-display symbol arrays each including a plurality of normal symbols and a plurality of blank symbols arranged among the normal symbols, and then rearrange the normal symbols and the blank symbols in a symbol display region having a matrix of cells; a controller, wherein the controller generates a first prize when the normal symbols are rearranged in the symbol display region in a predetermined manner, and generates a second prize lower than the first prize when a predetermined number or more of the blank symbols are rearranged in the symbol display region.

With the structure in which the blank symbols are arranged among the normal symbols in the symbol arrays, the number of normal symbols displayed in the symbol display region is reduced, and the blank symbols are displayed instead. This lowers the probability of the first prize occurrence caused by the normal symbols, as compared with known gaming machines. Further, the number of blank symbols rearranged, in place of some of the normal symbols is predetermined number or more, the blank symbols may generate a second prize. As the result, the probability of the first prize occurrence is controlled by arranging the blank symbols among the normal symbols. Since the blank symbols which cause lower probabilities of the first prize occurrence may generate the second prize, the players are able to play the game without a feeling that the gaming machine is less profitable.

Further, the gaming machine of the present invention further includes a game result display device configured to display a game result related to the first prize and the second prize, wherein when the first prize and the second prize simultaneously occur, the controller alternately repeats displaying of the first prize and displaying of the second prize.

With the structure, when the first prize and the second prize simultaneously occur, displaying of the prizes is alternated. This allows clear displaying of the game results to the player, facilitating the player's understanding which prize the game result involves.

Further, the gaming machine of the present invention is adapted so that the predetermined number is a maximum number of blank symbols which can be displayed in the symbol display region.

With the structure, the second prize occurs when the number of blank symbols displayed is the maximum number of blank symbols which can be displayed in the symbol display region. For example, in cases where the symbol display region includes a matrix of three rows and five columns, the maximum number of blank symbols displayed is ten, because the normal symbols and the blank symbols are alternated. Thus, the probability of the second prize occurrence is minimized, and the probability of the first prize occurrence is lowered by the blank symbols, and the probability of the prize occurrence as a whole is restrained.

The present invention enables control of probability of a prize occurrence without provision of a space among symbols on the reels.

BRIEF DESCRIPTION OF THE DRAWINGS

FIG. 28 shows a table indicating the relationship between remaining count numbers and seconds.

FIG. 29 shows a table indicating the relationship between bet payout rates and seconds.

FIG. 33 illustrates operation steps of the gamble game.

FIG. 36 illustrates operation steps of the gamble game.

DESCRIPTION OF THE PREFERRED EMBODIMENTS

The following will describe a gaming machine of the present invention with reference to figures.

(Outline of Gaming Machine)

Figure 1:
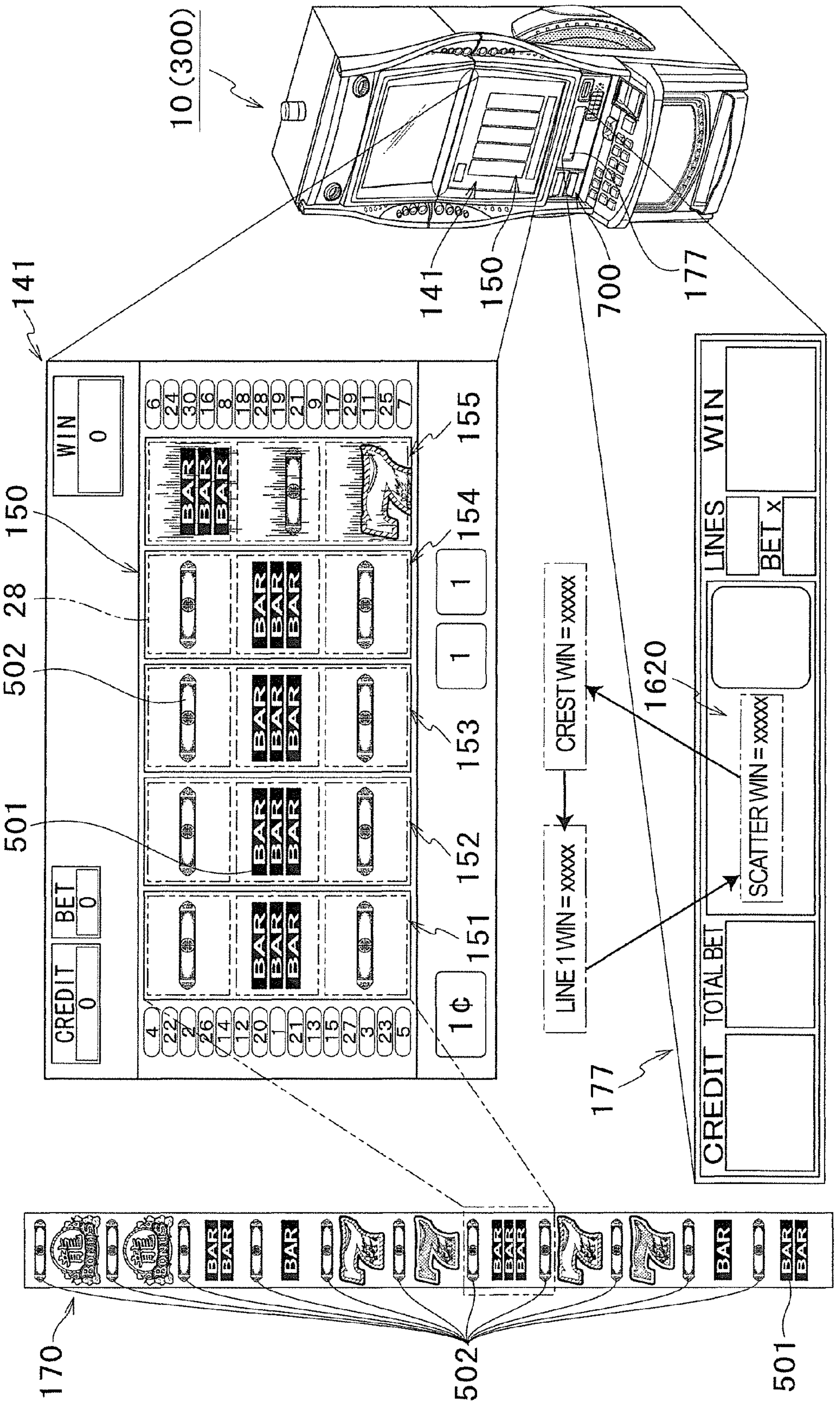
FIG. 1 illustrates an operation state of a gaming machine.

As shown in FIG. 1, a slot machine 10 (gaming machine 300) includes a lower image display panel 141 serving as a symbol display device. In the lower image display panel 141, a symbol array 170 having a plurality of normal symbols 501 and a plurality of blank symbols 502 among the normal symbols 501 are variable-displayed, and then the symbols 501 and the blank symbols 502 are rearranged in a symbol display region 150 having therein a matrix of display blocks (cells) 28.

When the normal symbols 501 are rearranged in the symbol display region 150 in a predetermined form, the slot machine 10 generates a first prize, and when a predetermined number or more of blank symbols 502 are arranged in the symbol display region 150, the slot machine 10 generates a second prize which is lower than the first prize.

With arrangement of the identical blank symbols 502 among the normal symbols 501 on the symbol array 170, the number of the normal symbols 501 to be displayed in the symbol display region 150 is reduced, and instead the blank symbols 502 are displayed. This causes lower probabilities of the first prize occurrence by the normal symbols 501 than those in known gaming machines. Further, it is possible to have the second prize occurred by the blank symbols, when a predetermined number or more of the blank symbols 502 are rearranged in places of the normal symbols 501. As the result of arranging the blank symbols 502 among the normal symbols 501, it is possible to control the probabilities of the first prize occurrence. Further, with the blank symbols 502 which cause lower probabilities of the first prize occurrence, there is a probability of the second prize occurrence. This induces players to play the games, without a feeling of disadvantage.

It should be noted that the gaming machine 300 is structured so as to enable participation of multiple players, and a plurality of slot machines 10 serving as the gaming terminals are connected to a center controller 200 (FIG. 2, FIG. 3) in such a manner as to enable data communications. In the gaming machine 300, a base game such as a slot game is executed individually in each of the slot machines 10, and the slot machines 10 are synchronized to execute a common game on a common display device 700 or the like. Note that the connection between the slot machine 10 and the center controller 200 may be wired, wireless, or a combination of wireless and wired connections.

In the present embodiment, a game starts with a bet placed by a player. Then, a payout is awarded to the player according to the game result (prize). The unit of the bet amount may be a national or regional currency such as "dollar" and "euro", or gaming points used in facilities and industry related to the gaming machine 300. In other words, the slot machine may adopt such a structure that a gaming point is stored in a memory when a game medium is input, and the game is executed by inputting the gaming point stored. Therefore, the bet may be an input of the gaming point, the bet amount may be an amount of gaming points input for executing the game, and the payout may be a gaming point awarded based on the game result.

The symbols to be rearranged are randomly determined. The symbols randomly determined or rearranged may be referred to as "resulting symbols". Further, variable-display of the symbols may be expressed as "spin of the symbols". Further, the rearranging of the symbols may be also expressed as "stopping of the symbols".

(Outline of Gaming Machine: Definitions)

The slot machine 10 above is a kind of the gaming terminals in the gaming machine 300. Although the present embodiment deals with the slot machine 10 as an example of the gaming terminal, the disclosure is not limited to this and any type of device having a terminal controller that is able to independently run a base game may be used as the gaming terminal.

The base game in the present embodiment is run by the slot machine 10. The base game is a slot game of rearranging a plurality of normal symbols 501. The base game is not limited to the slot game but is any type of games capable of being independently run at a gaming terminal such as the slot machine 10. In other words, the base game is a game in contrast to the common game. For example, a normal game and a bonus game that are described later are types of the base game.

The rearrangement of the symbols in the slot game is performed on the lower image display panel 141. The slot game may have a normal game, a bonus game, and a rescue process, and the like. In the normal game, a process is executed in which the symbols are rearranged on the lower image display panel 141, on condition that a gaming value is bet, and in which a normal payout is awarded according to the symbols rearranged. The bonus game is executed when the symbols are rearranged to meet a predetermined condition in the normal game.

The "bonus game" is a synonym to "feature game". The bonus game may be any type of games as long as the bonus game is more advantageous than the normal game. Further, as long as the bonus game is advantageous to the player, i.e., more advantageous than the normal game to the player, the bonus game may be adopted in combination with another bonus game. For example, in the bonus game, various states such as a state in which more gaming values can be achieved as compared to the normal game, a state in which the probability of obtaining a gaming value is higher than the probability in the normal game, and a state in which the number of consumed gaming values is smaller than in the normal game are achieved independently or in combination.

For example, the bonus game may involve a fixed payout, or may be a free game that requires betting of a gaming value less than that required for playing the normal game (such a gaming value may include zero). Further, a symbol random determination table with higher payout rates than those for the normal game may be adopted. Further, the bonus game may be a pickup bonus which presents a plurality of choices to the player. In cases of the pickup bonus, the choices may include a fixed payout, a free game, and the like. Further, the choices of the pickup bonus may include a trigger for another pickup bonus game which allows the player to make another selection. It should be noted that the choices of the pickup bonus are preferably randomly arranged. Further, the content of the choices of the pickup bonus is preferably not displayed before the player makes the selection. The bonus game of the present embodiment is detailed later. The rescue process is executed when a rescue start condition is established.

A coin, a bill, or electrically valuable information corresponding to these is used as a gaming value. It is to be noted that the gaming value in the disclosure is not limited to these, and for example game medium such as a medal, a token, electric money, a ticket, or the like can be adopted. The ticket is not particularly limited and may be, for example, a later-described ticket with a barcode. Further, as hereinabove described, the "gaming value" may be an electronic gaming point which corresponds to the game medium.

A free game is a game which is executable with a smaller amount of gaming values bet than in the normal game. The expression "executable with a smaller amount of gaming value bet" includes a case where an amount of gaming values bet is zero. Therefore, the free game may be a game which is run without betting a gaming value and the gaming value is paid out for an amount corresponding to rearranged normal symbols 501. In other words, the free game may be a game that starts even if no gaming value is consumed. On the other hand, the normal game is run on condition that a gaming value is bet, and is a game of paying out gaming value for an amount corresponding to rearranged normal symbols 501. In other words, the normal game is a game that starts with the consumption of the gaming value.

The term "rearrangement" indicates that the normal symbols 501 are rearranged after the arrangement of the normal symbols 501 is dismissed. The term "arrangement" indicates a state in which the normal symbols 501 are visually recognizable by an external player.

The phrase "normal payout based on the rearranged normal symbols 501" indicates a normal payout corresponding to a winning combination resulting from the rearrangement. The phrase "bonus payout based on the rearranged normal symbols 501" indicates a bonus payout corresponding to a winning combination resulting from the rearrangement. It is noted that the term "winning combination" indicates that a prize is established. Details of the winning combination will be given later.

Examples of "a condition in which the payout rate is higher than in the normal game" include the execution of a free game, increase in the number of the wild symbol 503*a* and the trigger symbol 503*b*, and the execution of a game using a symbol table. Examples of "rescue start condition" includes a case where the normal game is excessively repeated, i.e., the normal game is repeated for a predetermined number or more of times and a case where the total amount of obtained payout is excessively small, i.e., the obtained normal payout and bonus payout is smaller than a predetermined amount after a single player repeats the game for a predetermined number or more of times. The rescue process is a process to relieve players. Examples of the rescue process include the execution of a free game, the increase in the number of the wild symbol 503*a* and the trigger symbol 503*b*, the execution of a game using a substituted symbol table, and the awarding of an insurance payout.

The "first prize" and the "second prize" may simply be a normal payout or may be a prize that causes a bonus game as described above. The "second prize which is lower than the first prize" may mean that the first prize being a prize with a higher payout than the second prize, or that the first prize being a prize with a higher probability of winning a payout than the second prize.

In the following the blank symbol 502 is also referred to as crest symbol. Further, the second prize caused by the blank symbol 502 is also referred to as crest win. In the first prize, obtaining a payout as a result of having a predetermined number or more of normal symbols 501 on an activated line set in the symbol display region 150 or such a payout itself is also referred to as line win. Further, in the first prize, a payout resulting from an arrangement of a predetermined number or more of trigger symbols om the symbol display region 150 is referred to as scatter win.

(Outline of Gaming Machine: Other Arrangements)

The gaming machine 300 further include a VFD (Vacuum Fluorescent Display) 177 serving as a game result display device configured to display game results related to the first prize and the second prize. As shown in FIG. 1, the VFD 177 is provided in a later-mentioned PTS terminal 700. When the first prize and the second prize occur at the same time, the gaming machine 300 causes displaying of the first prize and displaying of the second prize to be repetitively alternated in the VFD 177. Specifically, there is a game status area 1620 at the center of the VFD 177, and a status of the game is displayed. For example, as a game result, when a scatter win and a line win which are each the first prize are achieved, and a crest win which is the second prize is achieved, the game status area 1620 of the VFD 177 first displays occurrence of the scatter win its payout, followed by displaying of the crest win and its payout, and displaying of the line win and its payout. Then, displaying of these three winnings is repetitively displayed. Note that the sequence of displaying the winnings is not limited to this.

As described, when the first prize (scatter win and line win) and the second prize (crest win) occur at the same time, the prizes are alternately displayed. This allows clear displaying of the game results to the player, facilitating the player's understanding which prize the game result involves.

Further, in the gaming machine 300, the number of crest symbols 502 needed to be rearranged to achieve the crest win is set to the maximum number of the blank symbols that can be displayed in the symbol display region. Specifically, in the present embodiment, the symbol display region 150 has a matrix of 15 display blocks 28 arranged in three rows and five columns. Each crest symbol 502 is arranged between the normal symbols 501 in the symbol array 170. That is, the same number of the crest symbols 502 and the normal symbols 501 are alternately arranged in the symbol array 170, and it is possible to rearrange ten crest symbols 502 at the most. In the present embodiment, the crest win occurs when ten crest symbols 502 are rearranged. As the result, since the probability of the second prize occurrence is minimized, while reducing the probability of the first prize occurrence by the blank symbol, the probability of a prize occurrence as a whole is restrained.

(Functional Flow of Gaming Machine 300: Slot Machine)

Figure 2:
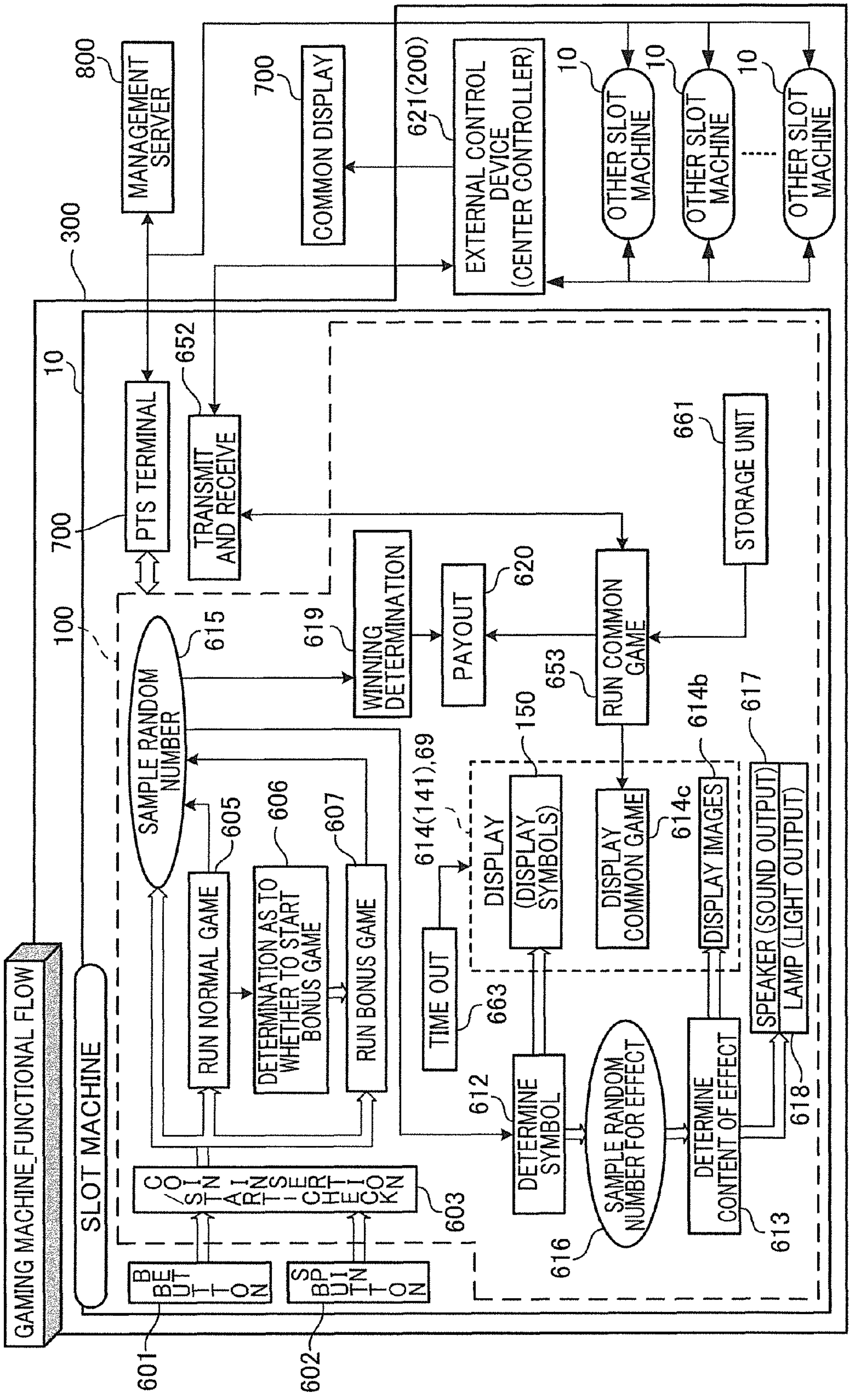
FIG. 2 illustrates a functional flow of the gaming machine.

The gaming machine 300 arranged as above includes, as shown in FIG. 2, slot machines 10 and an external controller 621 (center controller 200) connected to the slot machines 10 to be able to communicate therewith. The external controller 621 is able to communicate with the slot machines 10 provided in a hall.

Each slot machine 10 includes a BET button 601, a spin button 602, and a display 614 (such as a lower image display panel 141 shown in FIG. 1), and further includes a game controller 100 configured to control these units. The BET button 601 and the spin button 602 are kinds of input devices. The slot machine 10 further includes a transceiver unit 652 that makes it possible to perform data communication with the external controller 621.

The BET button 601 above has a function of receiving a bet amount input by the player. The spin button 602 has a function of receiving an instruction to start a game such as a normal game in response to an operation by the player, i.e., a start operation. The display 614 has a function of displaying still image information such as various normal symbols 501, crest symbols 502, numbers, and characters and moving image information such as effect movies. Furthermore, the display 614 has a touch panel 69 as an input device, and has a function of receiving various instructions input by a pressing operation by the player. The display 614 has a symbol display region 150, an image display region **614*b*, and a common game display region 614*c*. The symbol display region 150 displays a reel screen including the normal symbols 501 and the crest symbols 502 shown in FIG. 1. The image display region 614*b* displays various types of effect image information (including the common indication effect and the individual indication effect) executed during a game, by means of moving images and still images. The common game display region 614*c*** displays a common game.

Although in the present embodiment the symbol display region 150 the image display region **614*b*, and the lower image display panel 141 are provided on the same screen, the disclosure is not limited to this arrangement. The common game display region 614*c* may be formed together with the symbol display region 150 and the image display region 614*b***, or may appear as a substitute only when a common game is run.

The game controller 100 includes a coin insertion/start-check unit 603, a normal game running unit 605, a bonus game start determining unit 606, a bonus game execution unit 607, a random number sampling unit 615, a symbol determining unit 612, an effect-use random number sampling unit 616, an effect determining unit 613, a speaker unit 617, a lamp unit 618, a winning determining unit 619, a payout unit 620, and an indication effect unit 651.

The normal game running unit 605 has a function of running a normal game when an operation of the BET button 601 is made. The bonus game start determining unit 606 determines whether to run a bonus game, based on a combination of the normal symbols 501 rearranged in the normal game. That is to say, the bonus game start determining unit 606 has a function of determining that a bonus game is obtained when a trigger symbol **503*b* or the like is rearranged in a predetermined condition, and shifting the process to the bonus game execution unit 607** so that a bonus game is run from the next unit game.

It is noted that "unit game" is a series of operations from the start of the receiving of a bet to a state in which an award can be established. For example, a unit game in the normal game includes a single bet time for receiving a bet, a single game time of rearranging stopped normal symbols 501 and crest symbols 502, and a single payout time of a payout process of awarding a payout. A unit game in the normal game is termed unit normal game. Note that, in the present embodiment, it takes three seconds from the start of variable-displaying the symbols by a player-operation of the spin button to rearrangement of the symbol; however, the present invention is not limited to this.

The bonus game execution unit 607 has a function of running a bonus game in which a free game is repeated only by an operation of the spin button 602.

The symbol determining unit 612 has functions of: determining normal symbols 501 to be rearranged with reference to a random number from the random number sampling unit 615; rearranging the determined normal symbols 501 on the symbol display region 150 of the display 614; outputting rearrangement information of the normal symbols 501 to the winning determining unit 619 and the indication effect unit 651; adding an increased specific symbol 503 to the normal symbols 501 that are used for symbol determination; replacing at least one of the normal symbols 501 used for the symbol determination with at least one of the increased specific symbols 503; and outputting an effect specifying signal to the effect-use random number sampling unit 616 based on the state of the rearrangement of the normal symbols 501.

The effect-use random number sampling unit 616 has a function of sampling an effect random number when receiving an effect instruction signal from the symbol determining unit 612 and a function of outputting the effect random number to the effect determining unit 613. The effect determining unit 613 has a function of determining the effect content by using the effect random number, an effect of outputting the image information of the determined effect content to the image display region **614*b* of the display 614, and a function of outputting audio/light information of the determined effect content to the speaker unit 617 and the lamp unit 618**.

The winning determining unit 619 has a function of determining the presence of winning when obtaining rearrangement information of the normal symbols 501 and the crest symbols 502, which is a display state of rearrangement on the display 614, a function of calculating a first prize, a second prize, or a total payout amount based on the winning combination when it is determined that winning is achieved, and a function of outputting a payout signal to the payout unit 620 based on the payout amount. The payout unit 620 has a function of paying out a gaming value to the player, in the form of a coin, a medal, a credit, or the like. Furthermore, the payout unit 620 has a function of adding credit data corresponding to the credit to be paid out to credit data stored in an IC card inserted into the later-described PTS terminal 700. Further, the payout unit 620 has a function of repetitively alternating display of the first prize occurrence and display of the second prize occurrence with their payout amount on the VFD 177 of the PTS terminal 700, based on payout signals from the winning determining unit 619.

The indication effect unit 651 has a function of executing an indication effect indicative of a winning of the second bonus game, during the first bonus game (when the last selection game is executed). Further, the indication effect unit 651 may have a function of executing various indication effects at a predetermined probability, and a function of indicating the winning of various bonus games and executing the indication effect indicative of the type of the bonus game. Furthermore, the indication effect unit 651 may have a function of determining or randomly determining whether to execute any of various effects based on the rearrangement information of the normal symbols 501, when such rearrangement information is obtained, and a function of executing any of the various effects by the display 614 and the speaker 617 and the lamp 618 of the top box 12.

In addition to the above, the game controller 100 includes a storage unit 661 that stores various types of bet amount data. The storage unit 661 stores data in a rewritable manner, e.g., a hard disc device and a memory. For example, in the storage 661 is stored data and the like of the payout amounts by the first prize and the second prize, the symbol array 170 on which the normal symbols 501 and the crest symbols 502 are alternately arranged.

In addition to the above, the game controller 100 has a common game running unit 653. The common game running unit 653 has functions of: outputting bet amount information based on a bet amount bet on a normal game to the external controller 621 in each unit base game; executing a common game in response to a game start command from the external controller 621; and receiving a bet input through the BET button 601 for a bet amount corresponding to bet amount data for a common game, which is stored in the storage unit 661 and is bettable on a common game.

In addition to the above, the game controller 100 is connected to the PTS terminal 700. The PTS terminal 700 is a unit in which an LCD, a microphone, a human body detection camera, etc. are integrated, and has, for example, a function of executing an effect for a game by mutual communications with the game controller 100. In particular, the PTS terminal 700 has a card slot to which an IC card can be inserted. With this, the player is able to insert a IC card into the card slot and use the credits stored in the IC card in the slot machine 10.

In addition to the above, when receiving credit data from the PTS terminal 700, the game controller 100 updates the credit display on the display 614. Furthermore, the game controller 100 outputs settled credit data to the PTS terminal 700 when the credits on a game are settled.

Furthermore, the PTS terminal 700 of each of the slot machines 10 constituting the gaming machine 300 is connected to the management server 800 to be able to communicate each other, and centrally manages the download of images, IC cards and credits.

(Function Flow of Gaming Machine 300: External Controller)

Figure 3:
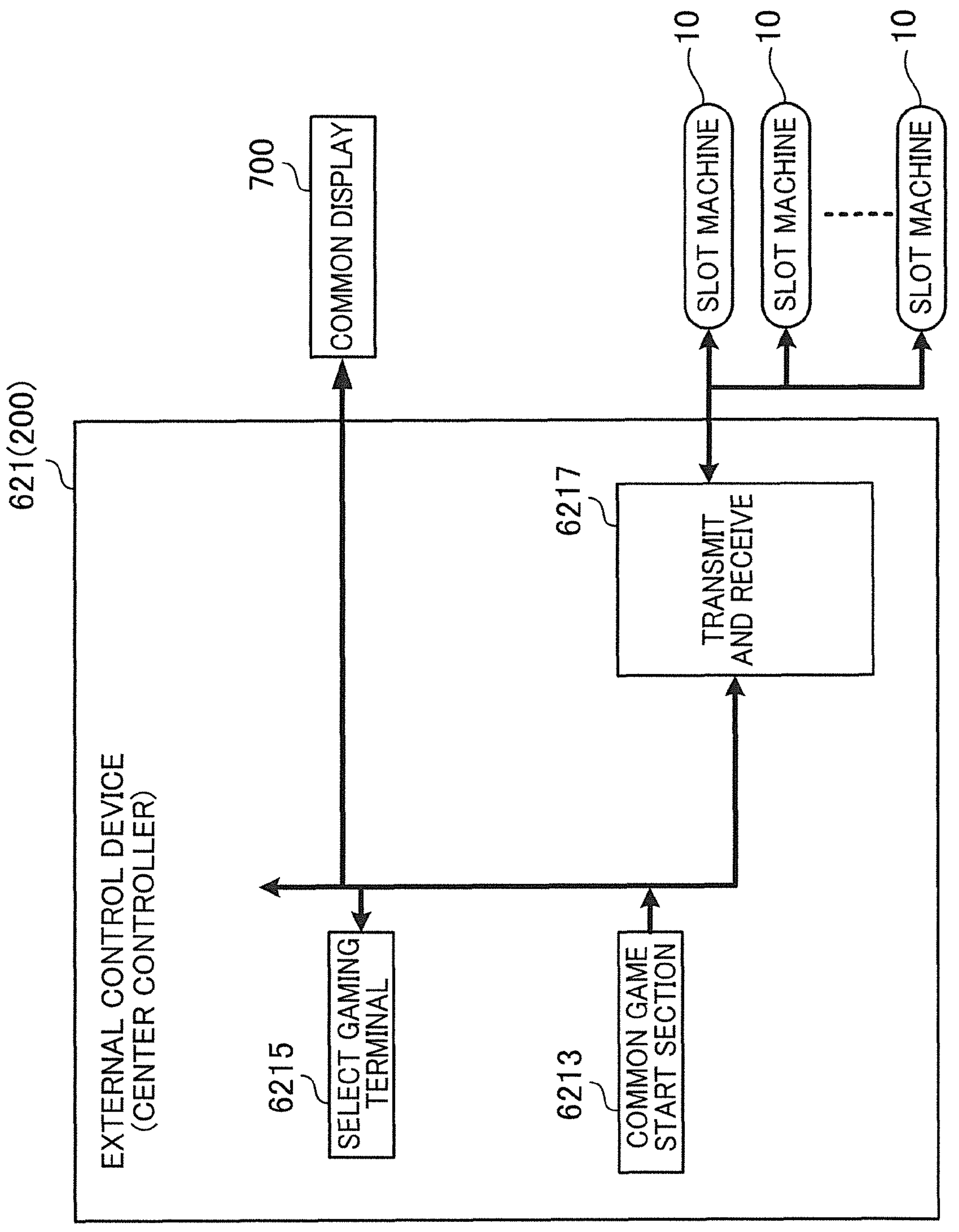
FIG. 3 illustrates a functional flow of the gaming machine.

The slot machine 10 arranged as above is, as shown in FIG. 3, connected to the external controller 621. The external controller 621 has a function of remotely operating and monitoring the operation state of each slot machine 10 and processes such as changes in game setting values. Furthermore, the external controller 621 has a function of determining a common game start condition for each gaming terminal which is the slot machine 10, and executing a common game at a plurality of slot machines 10 when a determination result at any gaming terminal satisfies the common game start condition.

More specifically, the external controller 621 includes a common game start unit 6213, a gaming terminal selection unit 6215, and a transceiver unit 6217. The common game start determining unit 6213 has functions of: determining whether the common game start condition is established based on the accumulated bet amount information sent from the slot machine 10 in each unit base game; outputting a game start command to a plurality of slot machines 10; and displaying on the common display device 700 states until the common game start condition is established.

The determination as to whether the common game start condition is established is based on the accumulated bet amount information or based on all accumulated values that increase as the unit base game is repeated. For example, the number of times of running the base game and the game time of the base game may be used as the accumulated values.

In addition to the above, the common game start unit 6213 has a function of outputting a game start command to the slot machine 10 in which an accumulated value that increases as a result of the repetition of the base game satisfies a game running condition. With this, because the right to participate in the common game is not awarded to a slot machine 10 in which the accumulated value is lower than the minimum setting value, the common game start unit 6213 motivates the player to actively repeat the base game.

In addition to the above, the common game start unit 6213 has a function of monitoring a non-input time in which no start operation is performed, and outputting the game start command to the slot machines 10 except to the slot machine 10 in which the non-input time is equal to or longer than a timeout time. With this, the common game start unit 6213 is able to determine that no player is at a slot machine 10 where the base game has not been played at least for the timeout time, and able to avoid the execution of the common game at such a slot machine 10.

The gaming terminal selection unit 6215 has a function of selecting a specific slot machine 10 from the slot machines 10 and outputting a common game start command signal to that specific slot machine 10. The common game start command signal provides the specific slot machine 10 with the right to start the common game. The transceiver unit 6217 has a function of exchanging data with the slot machines 10.

(Operations of Gaming Machine 300)

The operations of the gaming machine 300 having the functional blocks above will be described. While in the present embodiment the "gaming terminal" shown in the flowcharts indicates a slot machine 10 executing a slot game, the disclosure is not limited to this arrangement.

(Operations of Slot machine 10)

A slot machine 10 which is a gaming terminal executes terminal-side processes. More specifically, to begin with, a base game process (e.g., normal game) is executed. That is, a series of operations below are executed.

(Coin-Insertion/Start-Check)

First, the slot machine 10 checks whether or not a BET button 601 has been pressed by a player, and subsequently checks whether or not a spin button 602 has been pressed by the player.

(Symbol Determination)

Next, when a spin button unit 602 has been pressed by the player, the slot machine 10 extracts a random number for symbol determination, and determines normal symbols 501 and crest symbols 502 to be displayed for the player at the time of stopping the scroll of the symbol array 170, for respective video reels displayed on a display unit 614.

(Symbol Display)

Then the slot machine 10 starts the scroll of the symbol array 170 of each video reel, and stops the scroll so that the determined normal symbols 501 and crest symbols 502 are displayed for the player.

(Winning Determination)

Subsequently, as the rotation of the symbol array 170 of each video reel is stopped, the slot machine 10 determines whether the combination of the symbols 501 displayed for the player is a combination related to winning.

(Payout)

When the combination of the normal symbols 501 and crest symbols 502 displayed for the player is a combination related to winning, the slot machine 10 offers, to the player, benefit according to the combination.

For example, when a combination of normal symbols 501 and crest symbols 502 related to a payout of coins has been displayed, the slot machine 10 pays out coins of the number corresponding to the combination of symbols 501 to the player.

Subsequently, whether to win a bonus combination is determined. When winning the bonus combination, a bonus game process is executed. On the other hand, when not winning the bonus combination, the normal game is run again. During a period in which the base game including such a normal game and bonus game is being run, execution state information indicating the start and end of the unit game such as the normal game and the bet amount on the unit game is transmitted to the external controller 621. With this, the external controller 621 centrally manages the execution state information of each slot machine 10.

(Operation of External Controller 621)

When the slot machines 10 operate as above, the external controller 621 executes the following center-side processes in synchronization with the slot machines 10.

To begin with, the external controller 621 receives the execution state information from each slot machine 10 and obtains the execution state of the base game. Thereafter, based on the number of the repetition of the base game, the accumulated bet amount, or the like, whether the common game start condition is established at any slot machine 10 is determined. When the common game start condition is not established, the acquisition of the execution state of the base game at each slot machine 10 is continued.

In the meanwhile, when the common game start condition is established, the game start command is simultaneously output to the slot machines 10 that satisfy the game running condition. Thereafter, a specific slot machine 10 is selected from the slot machines 10 satisfying the game running condition, and a common game start right instruction is output to the specific slot machine 10.

Thereafter, the external controller 621 waits for the common game start command to be supplied from the specific slot machine 10. Upon receiving the common game start command, the result of the common game is determined as a game result. The game result is, for example, win, lose, or draw. When the game result is not draw, at least a part of a draw game result is skipped among a series of temporarily-stored game results, and the remaining game results are serially output to the slot machines 10, as game result information.

Thereafter, based on the winning or losing game result, whether to win in the common game is determined. When lost, the execution state of the base game at each slot machine 10 is newly obtained. On the other hand, when won, a payout amount is calculated based on the bet amount bet on the common game at each slot machine 10, and the payout amount is sent to each slot machine 10 as payout information.

(Overall Structure of Game System)

A game system 350 including the gaming machine 300 having the functions above will be described.

Figure 4:
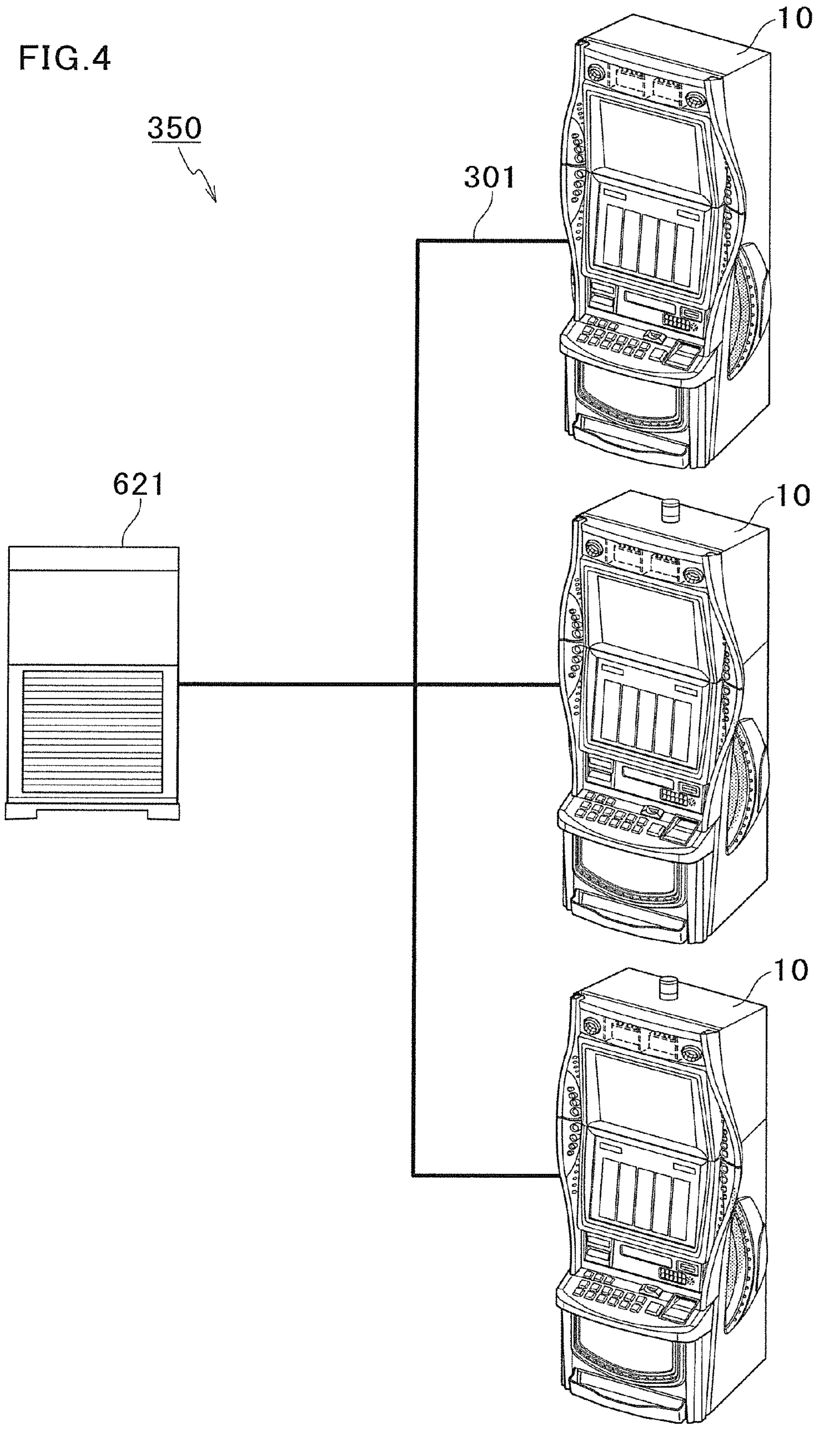
FIG. 4 is an explanatory diagram illustrating a connect structure of the gaming system.

As shown in FIG. 4, the game system 350 includes the slot machines 10 and the external controller 621 connected to the slot machines 10 over a communication line 301.

The external controller 621 is configured to control the slot machines 10. In the present embodiment, the external controller 621 is a so-called hall server provided in a gaming facility where a plurality of slot machines 10 are provided. Each slot machine 10 has a unique identification number, and the external controller 621 determines the source of data sent from the slot machines 10 based on the identification number. Furthermore, the identification number is used to specify the transmission target, when data is sent from the external controller 621 to a slot machine 10.

The game system 350 may be constructed in a single gaming facility where various games such as casino games are playable or constructed for a plurality of gaming facilities. When constructed in a single gaming facility, the game system 350 may be constructed in each floor or section of the gaming facility. The communication line 301 may be wires or wireless, and is constructed by a dedicated line, a switched line, or the like.

Figure 5:
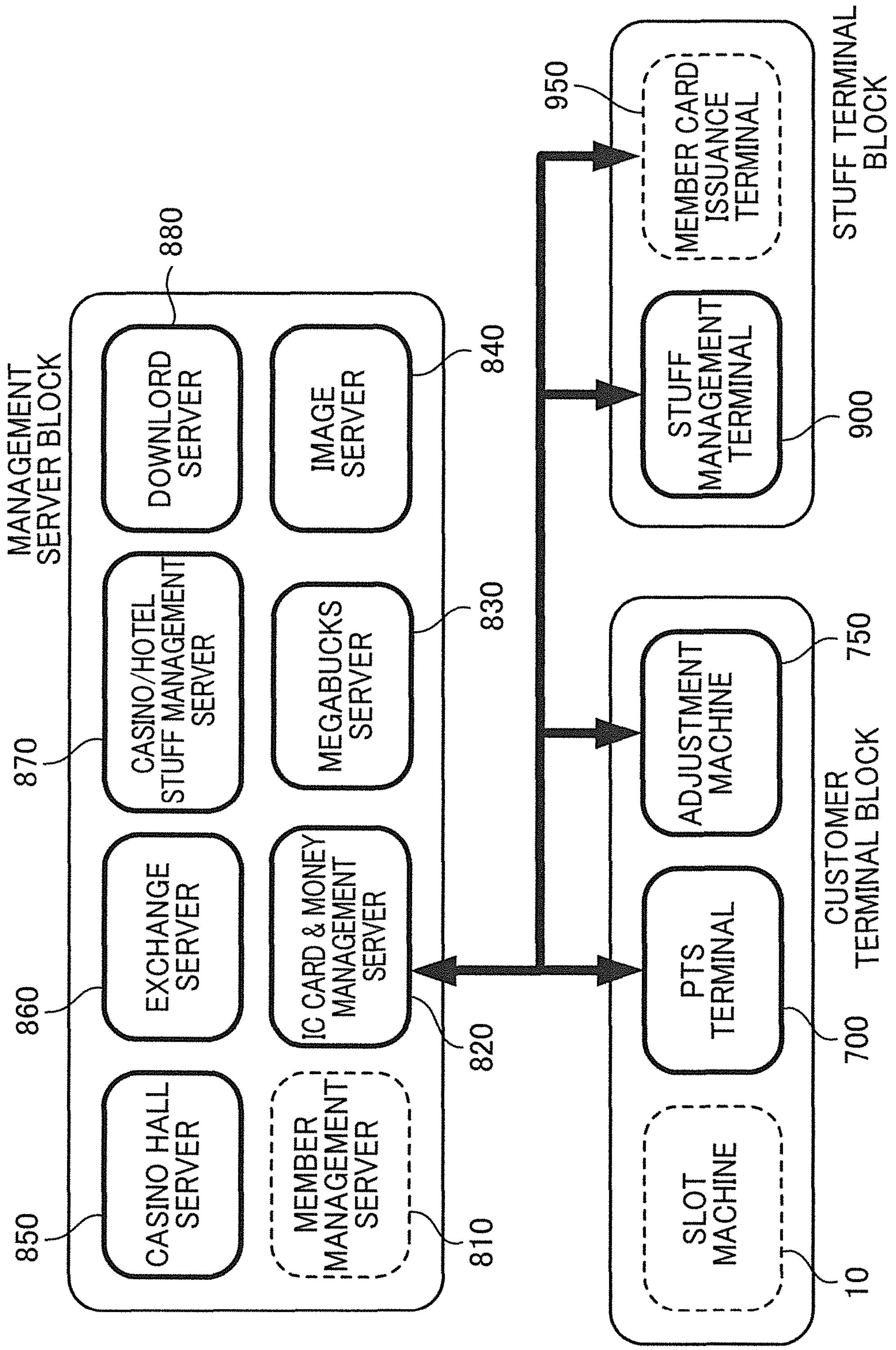
FIG. 5 is a block diagram of the gaming system.
Figure 6:
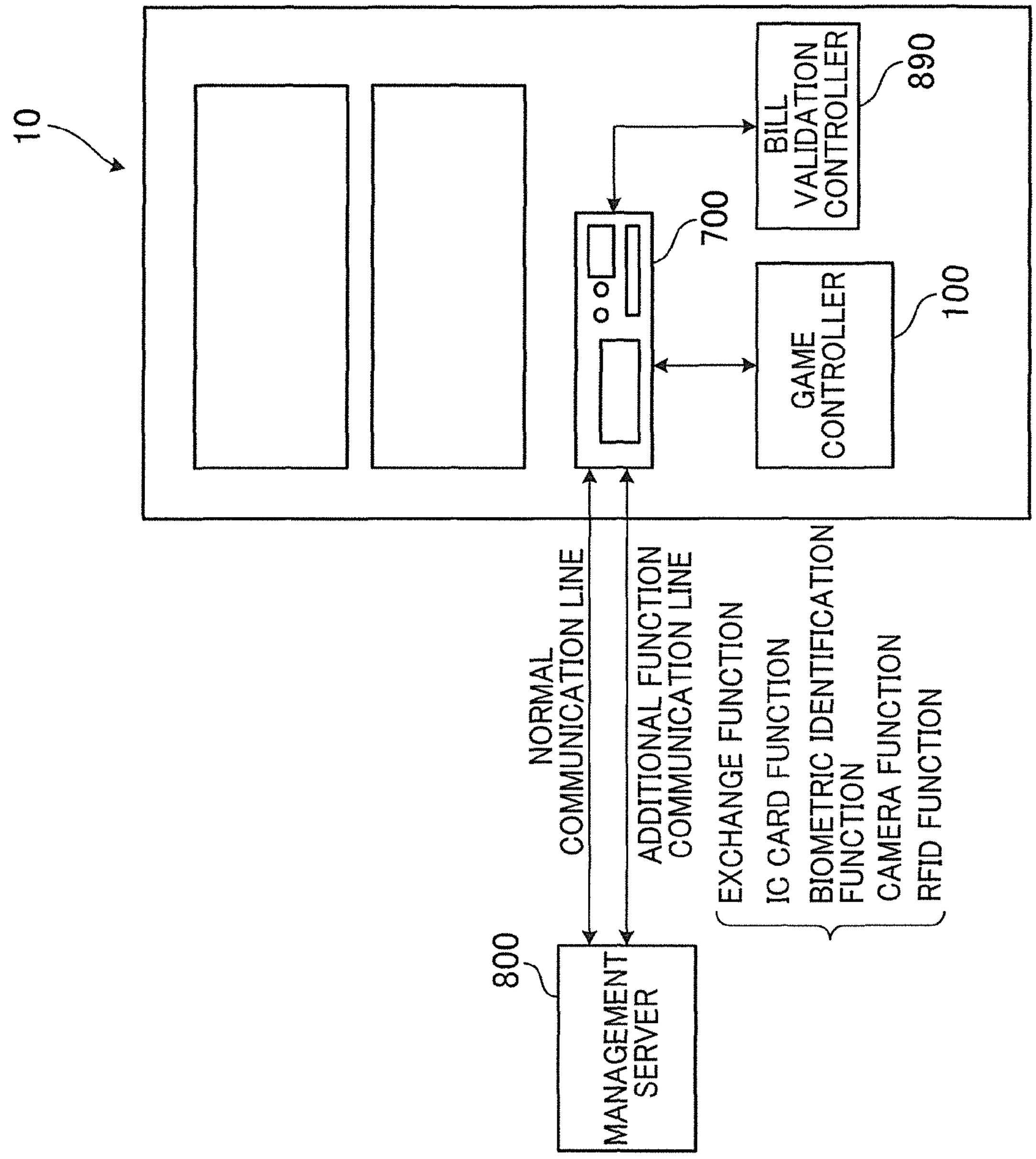
FIG. 6 is a block diagram of a PTS system.

As shown in FIG. 5, the game system is roughly divided into a management server block, a customer terminal block, and a stuff terminal block. The management server block includes a casino hall server 850, an exchange server 860, a casino/hotel stuff management server 870, and a download server 880.

The casino hall server 850 is a server for managing the entire casino hall where the slot machines 10 are provided. The exchange server 860 is a server for generating exchange rate data based on exchange rate information or the like. The casino/hotel stuff management server 870 is a server for managing the staff members of the casino hall or a hotel related to the casino hall. The download server 880 is a server for, for example, downloading latest information such as game-related information and news and forwarding the information to players via the PTS terminal 700 of each slot machine 10.

The management server block includes a member management server 810, an IC card & money management server 820, a megabucks server 830, and an image server 840.

The member management server 810 is a server for managing member information or the like of the players of the slot machines 10. The IC card & money management server 820 is a server for managing IC cards used in the slot machines 10. More specifically, the IC card & money management server 820 is a server that stores fractional money data in association with an identification code and outputs the fractional money data to the PTS terminal 700. Furthermore, the IC card & money management server 820 generates and manages denomination rate data or the like. The megabucks server 830 is a server for, for example, managing Mega bucks which is a game in which the sum total of amounts bet on a plurality of slot machines 10 in a plurality of casino halls is dealt with as a payout. The image server 840 is, for example, a server that downloads latest images such as game-related images and news images and forwards the images to the player via the PTS terminal 700 of each slot machine 10.

The customer terminal block includes the slot machine 10, a PTS terminal 700, and a settlement machine 750. The PTS terminal 700 is attachable to the slot machine 10 and capable of mutually communicating with the management server 800. The settlement machine 750 exchanges money data stored in a player's IC card to real money and stores coins and bills in an IC card as money data.

The stuff terminal block includes a stuff management terminal 900 and a member card issuance terminal 950. The stuff management terminal 900 is a terminal by which the staff of the casino hall manages the slot machines 10. In particular, in the present embodiment, the staff of the casino hall checks if the number of IC cards in the PTS terminal 700 is too large or too small. The member card issuance terminal 950 is a terminal by which a player obtains a member card to play games in the casino hall.

(PTS Terminal 700)

The PTS terminal 700 is incorporated in a PTS system as shown in FIG. 36. The PTS terminal 700 attached to the slot machine 10 is arranged to be able to communicate with the game controller 100 of the slot machine 10 and the bill validation controller 890.

The PTS terminal 700 conducts sound and image effects in games and updates the credit data, based on the communications with the game controller 100. Furthermore, the PTS terminal 700 sends credit data to the bill validation controller 890, which is required at the time of the settlement.

In addition to the above, the PTS terminal 700 is connected to the management server 800 to be able to communicate therewith. The PTS terminal 700 and the management server 800 are connected with each other by two lines, namely, a normal communication line and an additional function communication line.

The PTS terminal 700 exchanges, by the normal communication line, data such as money data, identification code data, member information of a player. On the other hand, by the additional function communication line, the PTS terminal 700 conducts communications concerning newly-added functions. In the present embodiment, the PTS terminal 700 conducts, by the additional function communication line, communications concerning an exchange function, an IC card function, a biometric identification function, a camera function, and an RFID (Radio Frequency Identification) function of individual identification by radio waves.

(Mechanical Structure of Slot machine)

Figure 7:
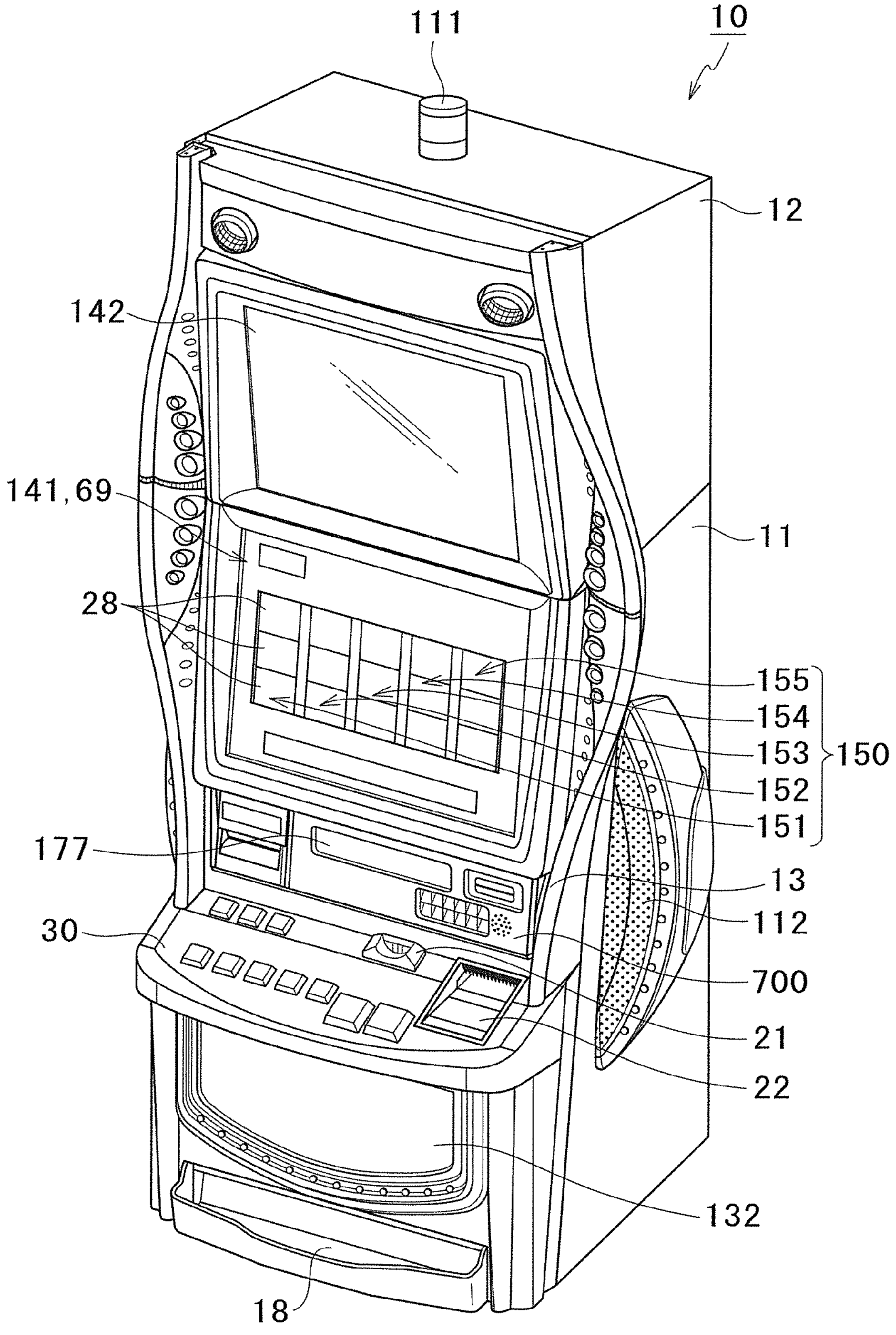
FIG. 7 is a perspective view of a slot machine in the gaming machine.

Referring to FIG. 7, the overall structure of the slot machine 10 will be described.

A coin, a bill, or electrically valuable information corresponding to these is used as a game medium in the slot machine 10. In the present embodiment, in particular, credit-related data such as money data stored in an IC card is used.

The slot machine 10 includes a cabinet 11, a top box 12 installed on the upper side of the cabinet 11, and a main door 13 provided at the front surface of the cabinet 11. 100

On the main door 13, a symbol display device termed lower image display panel 141 is provided. The symbol display device is formed by a transparent liquid crystal panel. The screen displayed on the lower image display panel 141 has a symbol display region 150 at the central portion. The symbol display region 150 is constituted by 15 display blocks 28 forming a matrix of 5 columns and 3 rows. The three display blocks 28 of each column form pseudo reels 151 to 155. On each of the pseudo reels 151 to 155, three display blocks 28 move downward with changes in speed, so that the normal symbols 501 and crest symbols 502 on the display blocks 28 are vertically rotated (variably displayed) and then stopped, in other words, the symbols are rearranged. The details of the display screen on the lower image display panel 141 will be given later.

While the present embodiment the slot machines 10 are so-called video slot machines, some or all mechanical reels in the slot machines 10 of the present invention may be replaced by the pseudo reels 151 to 155.

On the front surface of the symbol display device is provided a touch panel 69. The touch panel 69 allows a player to input various instructions by touching the display screen of the lower image display panel 141. The input signal is transmitted from the touch panel 69 to the main CPU 71.

Below the lower image display panel 141 is provided a control panel 30. The control panel 30 is provided with buttons, a coin entry 21 for inserting coins into the cabinet 11, and a bill entry 22. The control panel 30 has a take-win/collect button 32, the information button 45 ([i] button), and the game rule button 33 ([GAME RULES] button) on the left side area of its upper stage, and a 1-bet button 34, a 2-bet button 35, a 3-bet button 37, a 5-bet button 38, a 10-bet button 39 on the left side area of its central stage. Further, the control panel 30 has a play-1-line button 44, a play-5-line button 40, a play-9-line button 41, a play-20-line button 42, and a play-30-line button 43 on the left side area of its lower stage. Further, the control panel 30 has a reserve/gamble button 31 and a spin button 46 on the right side area of its lower part. Although illustration is not provided, these buttons 31 to 35, 37 to 46 each have therein an LED in such a manner that the ON/OFF state of the LED is controllable. The control panel 30 is detailed later.

On the lower front surface of the main door 13, i.e., below the control panel 30, a belly glass 132 on which a character of the slot machine 10 or the like is depicted are provided. Between the lower image display panel 141 and the control panel 30, the PTS terminal 700 is attached. In the PTS terminal 700, devices having a microphone function, a camera function, a speaker function, a display function and the like form a single unit. More specifically, the PTS terminal 700 includes an LCD, a human body detection camera, a microphone, a bass reflex speaker, or the like. The human body detection camera makes it possible to detect the presence of a player by the camera function. The microphone is used for the player's participation in a game by voice and the authentication of a player by voice recognition. The speaker produces sound effects in games and outputs notification sound when an IC card is left inserted. Furthermore, the speaker outputs notification sound when an inserted IC card is not authenticated.

In addition to the above, the PTS terminal is provided with an LED and a card slot. The LED emits light with plural colors to notify the remaining number of IC cards in a card stacker. The card slot has a mechanism of allowing IC cards to be inserted and ejected. The IC card has a display region. The IC card is completely inside the machine when the player is playing games, and is ejected to expose the display region at the time of the settlement. This allows the player to recognize the credit-related data such as updated money data. Alternatively, the IC card may be arranged to expose the display region not to be completely inserted, even when the player is playing games. This allows the player to always recognize the update of the credits during games.

When it is confirmed by the human body detection camera that no player is present at the time of the settlement of the credits, the IC card is drawn into and stored in the card stacker. With this arrangement, the IC card is not left inserted for a long time, even if the player left the machine without taking the IC card after recognizing that the remaining credits on the display region are small.

Figure 8:
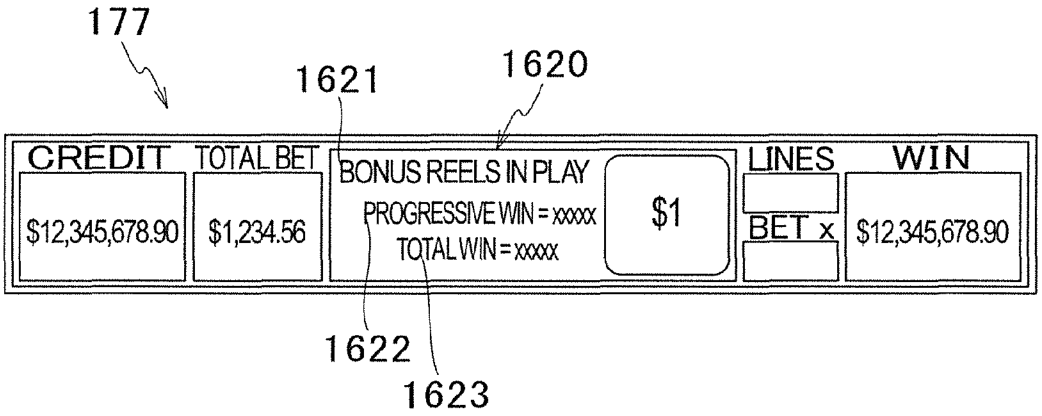
FIG. 8 is an explanatory diagram illustrating an example VDF display.
Figure 9:
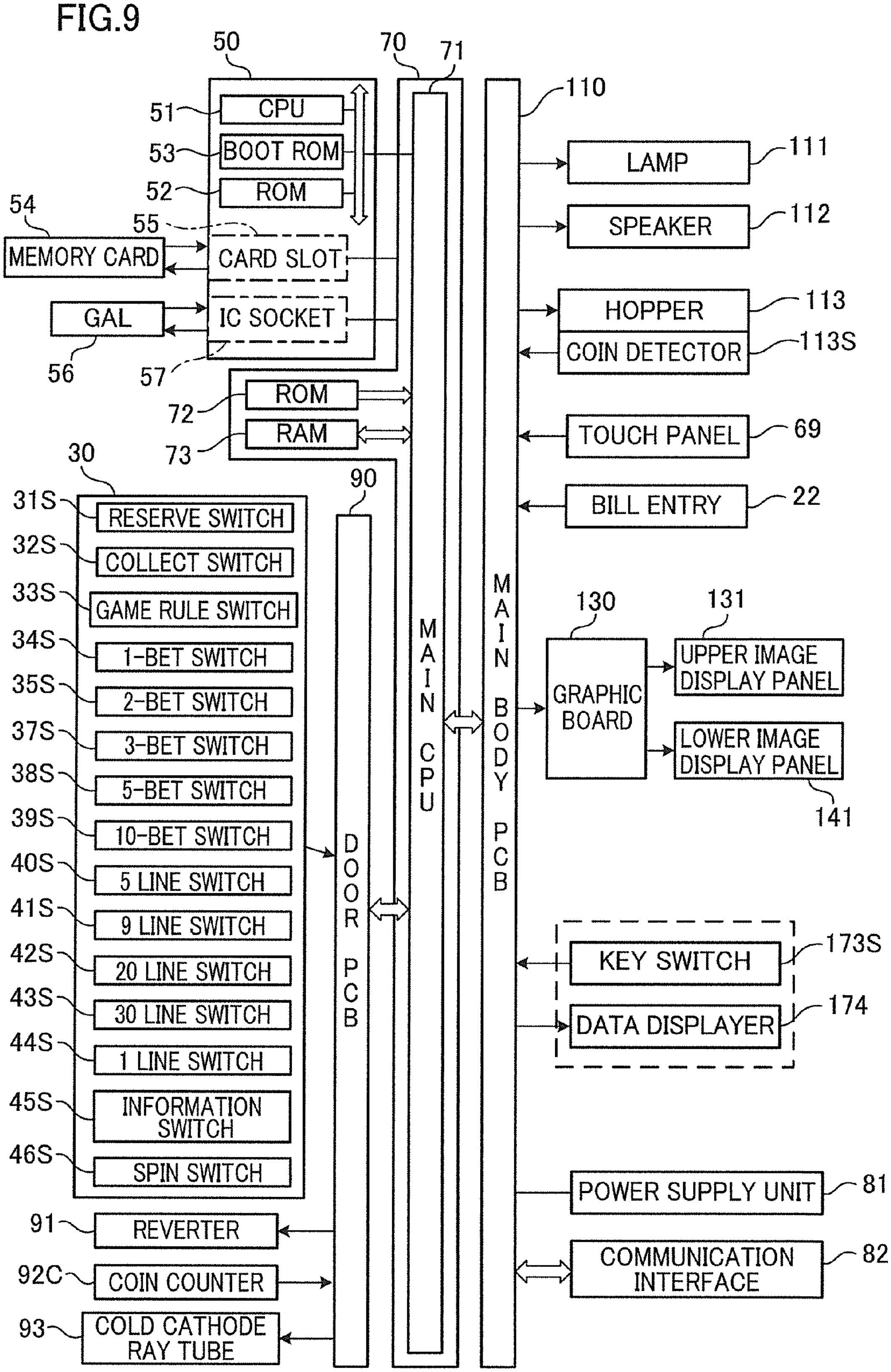
FIG. 9 is an electrical block diagram of the gaming machine.

Further, as described above, the PTS terminal 700 is provided with the VFD 177. As shown in FIG. 8, the VFD 177 has at its center the game status area 1620 which displays the status of the game. In the game status area 1620 is displayed the bonus state 1621, the winning content 1622, and obtained credit 1623 and the like. In addition to these, credits, total bet amount, denomination, lines, bet, win meter are displayed.

Further, the cabinet 11 has speakers 112 (output mechanism) which are symmetrically arranged on the left and the right. The slot machine 10 executes the effect by outputting images, sound, and light, by means of the speakers 112 and the effect mechanism 131.

(Electrical Configuration of Slot machine)

Now, referring to FIG. 20 the configuration of a circuit in the slot machine 10 will be described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression and a program for producing effects by images and sounds. The game program further includes a symbol determination program. The symbol determination program is a program for determining symbols to be rearranged on the display block 28.

The game program further includes sets of data such as: normal game symbol table data indicating a normal game symbol table that shows the relationship of each symbol in each symbol array of the display block, a code number, and a random number; bonus game symbol table data indicating a bonus game symbol table that shows the relationship of each symbol of each symbol array of the display block, a code number, and a random number; symbol number determination table data indicating a symbol array determination table; code number determination table data indicating a code number determination table; wild symbol increase amount determination table data indicating a wild symbol increase amount determination table; trigger symbol increase number determination table data indicating a trigger symbol increase number determination table; odds data indicating the relationship between the types and the number of symbols rearranged on an active line and a payout amount.

Further, the card slot 55 is configured so that the memory card 54 can be inserted thereinto and removed therefrom, and is connected to a motherboard 70 by an IDE bus. The type and contents of the game to be played on the slot machine 10 can be changed by drawing out the memory card 54 from the card slot 53S, writing another game program into the memory card 54, and inserting the memory card 54 into the card slot 53S.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the slot machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is constituted by a commercial general-purpose mother board (printed circuit board on which basic components for personal computers are mounted) and is provided with a main CPU 71, a ROM (Read Only Memory) 72, a RAM (Random Access Memory) 73, and a communication interface 82. This motherboard 70 is equivalent to the game controller 100 of the present embodiment.

The ROM 72 includes a memory device such as a flash memory, and stores a program such as BIOS (Basic Input/Output System) to be executed by the main CPU 71, and permanent data. When the BIOS is executed by the main CPU 71, processing for initializing predetermined peripheral devices is conducted. Further, through the gaming board 50, processing of loading the game program and the game system program stored in the memory card 54 is started. In the present invention, the ROM 72 may be or may not be rewritable.

The RAM 73 stores data used for the operation of the main CPU 71 and programs such as the symbol determination program. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of bets, the number of payouts, the number of credits and the like; and an area that stores symbols (code numbers) randomly determined.

The communication interface 82 is for communicating with the external controller 621 such as a server, through the communication line 301. Further, the motherboard 70 is connected with a later-described door PCB (Printed Circuit Board) 90 and a body PCB 110 by respective USBs. Further, the motherboard 70 is connected to the power supply unit 81. Furthermore, the motherboard 70 is connected with the PTS terminal 700 by USB.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a reserve switch 31S, a collect switch 32S, a game rule switch 33S, a 1-BET switch 34S, a 2-BET switch 35S, a 3-BET switch 37S, a 5-BET switch 38S, a 10-BET switch 39S, a play-1-lines switch 44S, a play-5-lines switch 40S, a play-9-lines switch 41S, a play-20-lines switch 42S, a play-30-lines switch 43S, an information switch 45S, a spin switch 46S, which correspond to the above-described buttons. Each of the switches outputs a signal to the main CPU 71 upon detection of press of the button corresponding thereto by the player.

Inside the coin entry 36 are provided a reverter 91 and a coin counter 92C. The reverter 91 verifies validates a coin inserted into the coin entry 36, and discharges coins other than genuine coins through a coin payout exit. The coin counter 92C detects the received genuine coins and counts the number of the coins.

The reverter 91 operates based on a control signal output from the main CPU 71, and distributes valid coins validated by the coin counter 92C into a hopper 113 or a cash box. That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the effect mechanism 131 and the lower image display panel 141, and lights up based on a control signal output from the main CPU 71.

The body PCB 110 is connected with the effect mechanism 131, the speakers 112, the hopper 113, a coin detecting portion 113S, the touch panel 69, the bill entry 22, a graphic board 130, a key switch 173S, and the data displayer 174. The speakers 112 output BGM sound or the like in accordance with a control signal output from the main CPU 71.

The hopper 113 operates based on a control signal output from the main CPU 71, and pays out coins of the specified number of payouts from the coin payout exit to an unillustrated coin tray. The coin detecting portion 113S outputs a signal to the main CPU 71 upon detection of coins paid out by the hopper 113.

The touch panel 69 detects a position on the lower image display panel 141 touched by a finger or the like of the player, and outputs a signal corresponding to the detected position to the main CPU 71.

The bill entry 22 authenticates the bills and receives genuine bills into the cabinet 11. The bills received by the cabinet 11 are converted onto the number of coins, and the credits equivalent to the converted coins are added as the credits owned by the player.

The graphic board 130 controls display of images conducted by the effect mechanism 131 and lower image display panel 141, based on a control signal output from the main CPU 71. The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

The key switch 173S is provided in the keypad 173, and outputs a predetermined signal to the main CPU 71 when the keypad 173 has been operated by the player. The data displayer 174 displays data read by the card reader 172 and data inputted by the player through the keypad 173, based on a control signal outputted from the main CPU 71.

(Symbols, Combinations, or the Like)

Figure 10:
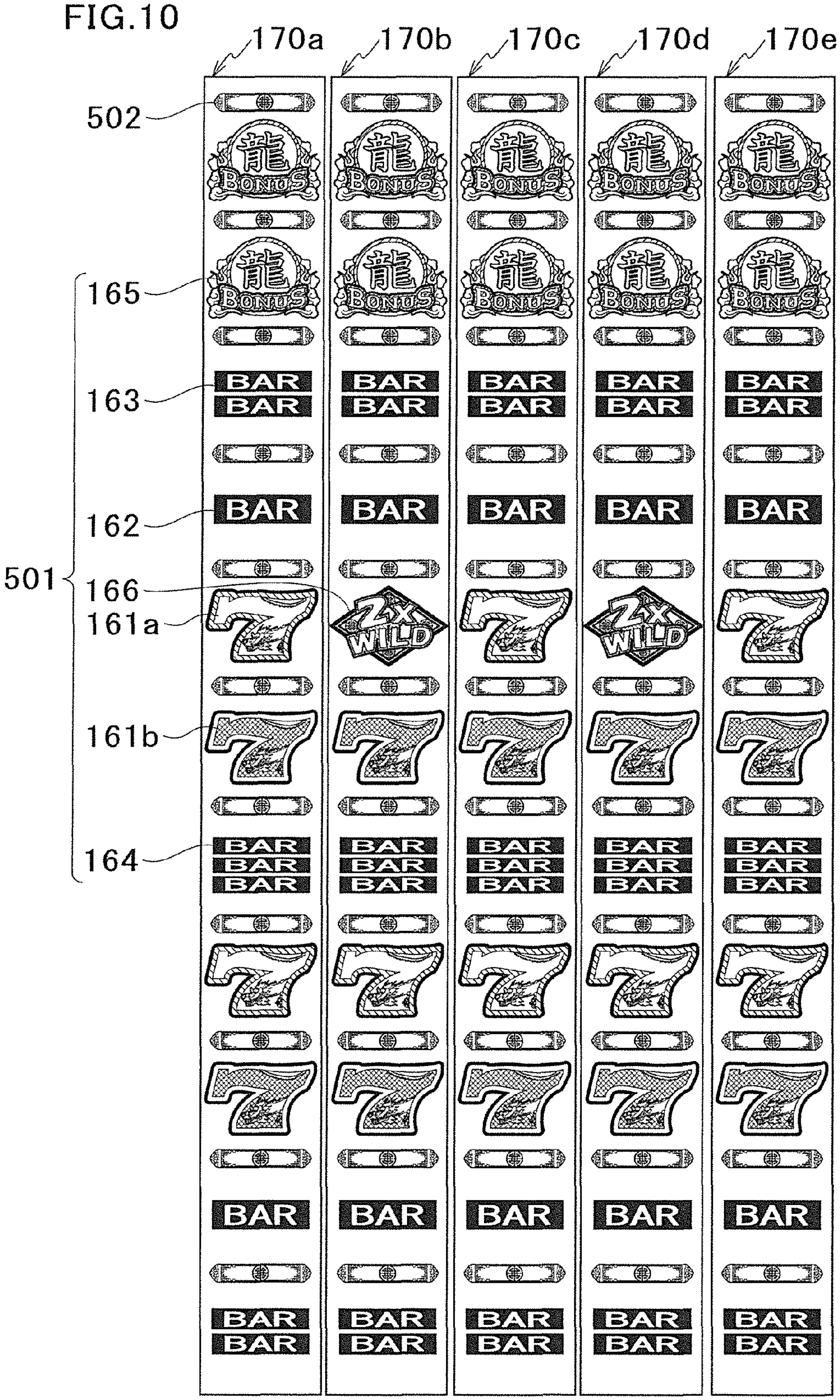
FIG. 10 is an explanatory diagram illustrating an example symbol array displayed on a pseudo reel.

The normal symbols 501 and the crest symbols 502 displayed on the pseudo reels 151 to 155 of the slot machine 10 form a symbol array 170 in which a plurality of the normal symbols 501 and the crest symbols 502 are alternately arranged. Specifically, the pseudo reels 151 to 155 are configured so that symbol arrays 170*a*, 170*b*, 170*c*, 170*d*, 170*e* shown in FIG. 10 are scroll displayed thereon. In each of the symbol arrays 170*a* to 170*e*, eleven normal symbols 501 and eleven crest symbols 502 are arranged. In all of the symbol arrays 170*a* to 170*e*, the normal symbols 501 and the crest symbols 502 are successively alternated.

The normal symbols 501 include a "red-seven" symbol 161*a*, a "blue-seven" symbol 161*b*, a "single-bar" symbol 162, a "double-bar" symbol 163, a "triple-bar" symbol 164, a "dragon" symbol 165 serving as a trigger symbol 503*b*, and a "double-wild" symbol 166 serving as a wild symbol 503*a*. One of code numbers ranging from 0 to 21 is assigned to each of the normal symbols 501 and the crest symbols 502 forming each symbol arrays 170*a* to 170*e*.

As shown in FIG. 1, three successive normal symbols 501 in a symbol array are displayed (arranged) in the upper stage, the central stage, and the lower stage of the display area of the pseudo reels 151 to 155 thereby forming a symbol matrix of five columns and three rows, in the symbol display region 150. The normal symbols 501 forming the symbol matrix are start being scrolled when at least the spin button 46 is pressed and the game is started. After a predetermined period from the start of scrolling, scrolling of the normal symbols 501 stops (rearrangement).

Further, for each of the normal symbols 501, various winning combinations are determined in advance. Note that the winning combination means that a prize is established. The winning combination is a combination of the normal symbols 501 stopped on an activated line, which brings about an advantageous state to the player. For example, the advantageous state is a state in which coins are paid out according to the winning combination, a state in which the number of coins paid out is added to the number of credits, and a state in which a bonus game is started.

Figure 11:
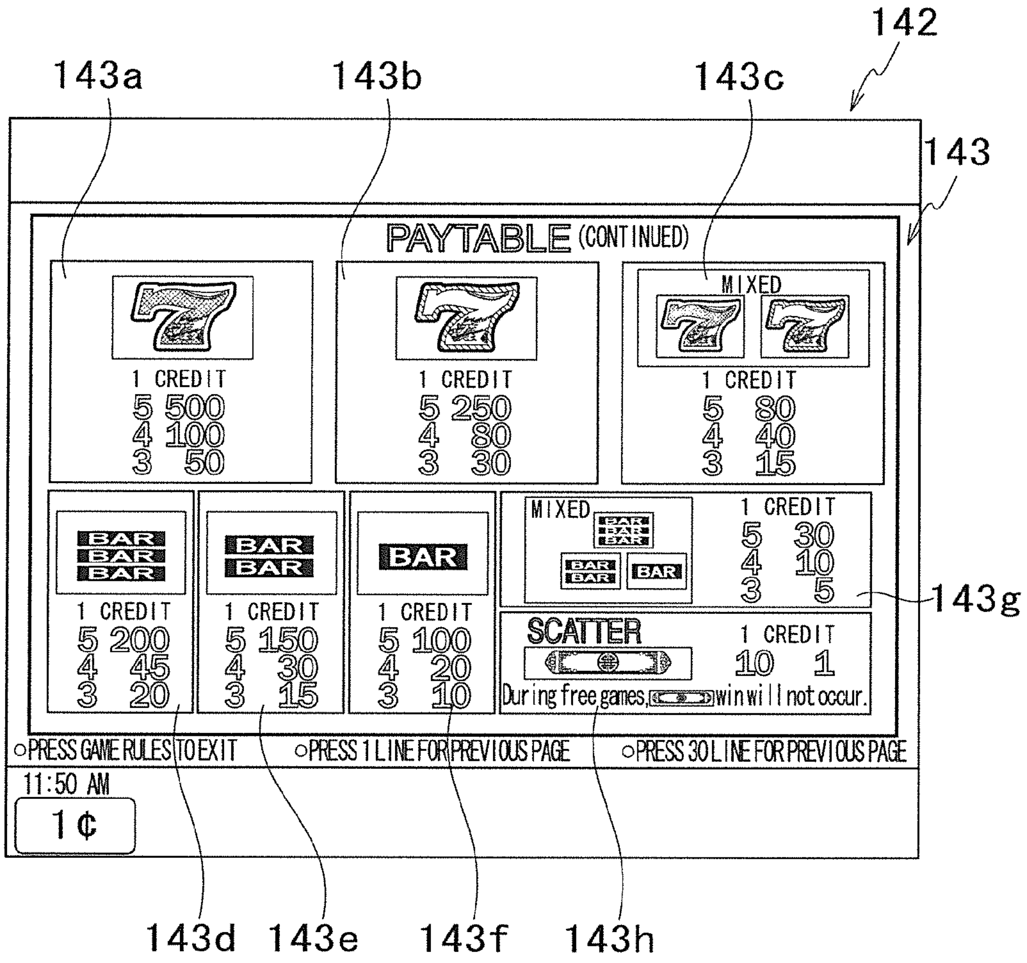
FIG. 11 is a diagram illustrating a first payout table image displayed on an upper image display panel.
Figure 12:
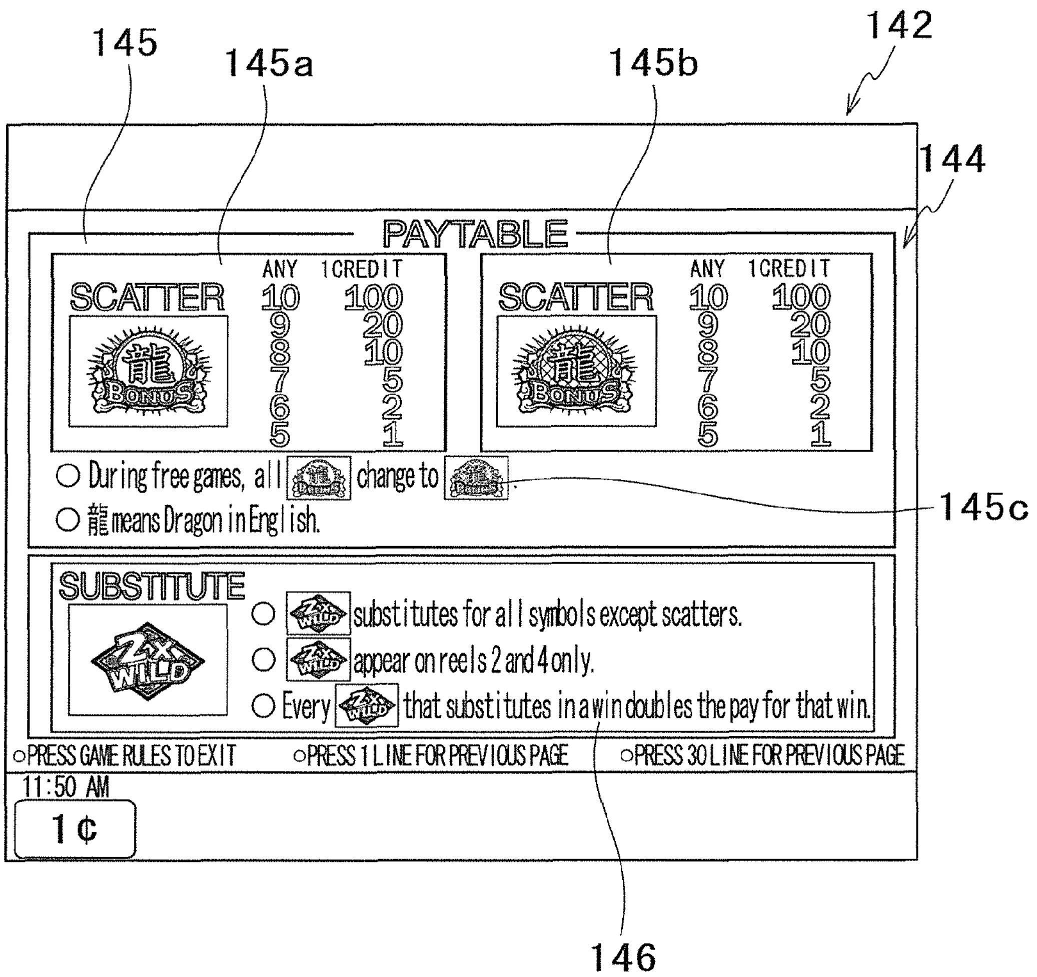
FIG. 12 is a diagram illustrating an example second payout table image displayed on the upper image display panel.

The winning combinations in the present embodiment include a winning combination which generates the scatter win, a winning combination which generates the line win, and a winning combination which generates the crest win. This is described specifically with reference to FIG. 11 and FIG. 12. FIG. 11 and FIG. 12 illustrates a first payout table image 143 and a second payout table image 144 indicating the payouts of the game, displayed on the upper image display panel 142. The first payout table image 143 is displayed on the upper image display panel 142 when the control panel 30 is operated. Further, the second payout table image 144 is displayed, switched from the first payout table image 143, on the upper image display panel 142, when the control panel 30 is operated while the first payout table image 143 is displayed.

As shown in FIG. 11, the first payout table image 143 indicates the payout rate for 1 credit of various winning combinations. The first payout table image 143 includes a red-seven payout image 143*a*, a blue-seven payout image 143*b*, a mix-seven payout image 143*c*, a triple-bar payout image 143*d*, a double-bar payout image 143*e*, a single-bar payout image 143*f*, a mix-bar payout image 143*g*, and a crest symbol payout image 143*h*. The red-seven payout image 143*a*, the blue-seven payout image 143*b*, the mix-seven payout image 143*c*, the triple-bar payout image 143*d*, the double-bar payout image 143*e*, the single-bar payout image 143*f*, and the mix-bar payout image 143*g* are each an image indicating the payout rate of various line wins. The crest symbol payout image 143*h* is an image indicating the payout rate of the crest win.

The red-seven payout image 143*a* shows the payout rate for the cases where a predetermined number or more of the red-seven symbols 161*a* are rearranged on an activated line. Specifically, when three red-seven symbols 161*a* are rearranged on the activated line, the payout rate is ×50. When four red-seven symbols 161*a* are rearranged on the activated line, the payout rate is ×100. When five red-seven symbols 161*a* are rearranged on the activated line, the payout rate is ×500.

The blue-seven payout image 143*b* shows the payout rate for cases where a predetermined number or more of the blue-seven symbols 161*b* are rearranged on an activated line. Specifically, when three blue-seven symbols 161*b* are rearranged on the activated line, the payout rate is ×30. When four blue-seven symbols 161*b* are rearranged on the activated line, the payout rate is ×80. When five blue-seven symbols 161*b* are rearranged on the activated line, the payout rate is ×250.

The mix-seven payout image 143*c* shows the payout rate for cases where the number of the red-seven symbols 161*a* and the number of the blue-seven symbols 161*b* (i.e., seven symbols 161) rearranged on an activated line totals a predetermined number of more. Specifically, when three seven symbols 161 are rearranged on the activated line, the payout rate is ×15. When four seven symbols 161 are rearranged on the activated line, the payout rate is ×40. When five seven symbols 161 are rearranged on the activated line, the payout rate is ×80.

The triple-bar payout image 143*d* shows the payout rate of cases where a predetermined number or more of triple-bar symbols 164 are rearranged on an activated line. Specifically, when three triple-bar symbols 164 are rearranged on the activated line, the payout rate is ×20. When four triple-bar symbols 164 are rearranged on the activated line, the payout rate is ×45. When five triple-bar symbols 164 are rearranged on the activated line, the payout rate is a double credit.

The double-bar payout image 143*e* shows the payout rate for cases where a predetermined number or more of the double-bar symbols 163 are rearranged on an activated line. Specifically, when three double-bar symbols 163 are rearranged on the activated line, the payout rate is ×15. When four double-bar symbols 163 are rearranged on the activated line, the payout rate is ×30. When five double-bar symbols 163 are rearranged on the activated line, the payout rate is ×150.

The single-bar payout image 143*f* shows the payout rate for cases where a predetermined number or more of single-bar symbols 162 are rearranged on an activated line. Specifically, when three single-bar symbols 162 are rearranged on the activated line, the payout rate is ×10. When four single-bar symbols 162 are rearranged on the activated line, the payout rate is ×20. When five single-bar symbols 162 are rearranged on the activated line, the payout rate is ×100.

The mix-bar payout image 143*g* shows the payout rate for cases where the triple-bar symbol 164, the double-bar symbol 163, and the single-bar symbol 162 (i.e., bar symbols 162 to 164) rearranged on an activated line totals a predetermined number or more. Specifically, when three bar symbols 162 to 164 are rearranged on the activated line, the payout rate is ×5. When four bar symbols 162 to 164 are rearranged on the activated line, the payout rate is ×10. When five bar symbols 162 to 164 are rearranged on the activated line, the payout rate is ×30.

The crest symbol payout image 143*h* shows the payout rate of the crest win which occurs when ten crest symbols 502 are rearranged in the symbol display region 150. Specifically, the payout rate of the crest win is ×1. The crest win occurs when there are ten display blocks 28 with the crest symbol 502 in the symbol display region 150 in which the normal symbols 501 and the crest symbols 502 are rearranged. In the present embodiment, the crest win occurs when the number of the crest symbols 502 rearranged is the maximum number of crest symbols 502 that can be displayed in the symbol display region 150; however, the crest win is not limited to this.

Further, the crest symbol payout image 143*h* indicates that the crest win does not occur during the free game.

Specific examples of payout by the crest win are described below. For example, where 1 bet is 30 credits, the bet amount is 30 credits for the crest win of 1 bet, and the payout of the crest win is 30 credits. For the crest win of 2 bets, the bet amount is 60 credits and the payout of the crest win is 60 credits. For the crest win of 3 bets, the bet amount is 90 credits, and the payout of the crest win is 90 credits. For the crest win of 4 bets, the bet amount is 120 credits, and the payout of the crest win is 120 credits. For the crest win of 5 bets, the bet amount is 150 credits, and the payout of the crest win is 150 credits. For the crest win of 10 bets, the bet amount is 300 credits, and the payout of the crest win is 300 credits. For the crest win of 15 bets, the bet amount is 450 credits, and the payout of the crest win is 450 credits. For the crest win of 20 bets, the bet amount is 600 credits, and the payout of the crest win is 600 credits.

In the present embodiment, the maximum value of the payout for the crest win is 600 credits. Therefore, three digits are reserved as the necessary number of digits for the crest win payout, in the VDF 177.

As shown in FIG. 12, the second payout table image 144 includes a scatter win payout image 145 showing the payout rate for the scatter win, and a wild symbol explanation image 146. The scatter win payout image 145 includes a dragon payout image 145*a* for a normal game, a dragon payout image 145*b* for a free game, and a dragon symbol explanation image 145*c*.

The dragon payout image 145*a* for a normal game shows an image indicating the dragon symbols 165 in the normal game, and the payout rate for the scatter win which occurs when a predetermined number or more of the dragon symbols 165 are rearranged in the symbol display region 150. The dragon payout image 145*a* for a free game shows an image indicating the dragon symbols 165 in the free game, and a payout rate for the scatter win which occurs when a predetermined number or more of the dragon symbols 165 are rearranged in the symbol display region 150. The payouts are as follows both in the normal game and the free game.

Namely, when five dragon symbols 165 are rearranged in the symbol display region 150, the payout rate is ×1. When six dragon symbols 165 are rearranged in the symbol display region 150, the payout rate is ×2. When seven dragon symbols 165 are rearranged in the symbol display region 150, the payout rate is ×5. When eight dragon symbols 165 are rearranged in the symbol display region 150, the payout rate is ×10. When nine dragon symbols 165 are rearranged in the symbol display region 150, the payout rate is ×20. When ten dragon symbols 165 are rearranged in the symbol display region 150, the payout rate is ×100.

When five or more dragon symbols 165 are rearranged in the symbol display region 150, shifting occurs from the normal game to the bonus game. In the bonus game, a roulette game and a plurality of times of free games are executed. The player is able to play the roulette game the same number of times as the number of the dragon symbols 165 rearranged in the unit game in which the shifting to the bonus game has occurred. The player is further able to obtain a payout according to the result of each roulette game. The roulette game is hereinafter also referred to as an obe-prize selection.

After the pickup bonus, the free game is executed a plurality of number of times (e.g., seven times). It should be noted that the number of free games may be fixed as in the present embodiment, or may be variable randomly or variable depending on the content of the normal game. The crest win does not occur during the free game. Further, the color of at least a part of the dragon symbol 165 is modified to a color different from that during the normal game.

The dragon symbol explanation image 145*c* include explanation related to the double-wild symbol 166. Specifically, the dragon symbol explanation image 145*c* explains that the double-wild symbol 166 can substitute for any symbol except the scatter symbol (dragon symbols 165 and crest symbols 502), that the double-wild symbol 166 only appears on the pseudo reel 152 and the pseudo reel 154, and that all the payouts obtained as the result of line win with the double-wild symbol 166 are doubled.

As described, the crest win, with ten crest symbols 502 being displayed in the symbol display region 150, yields ×1 payout. Therefore, it is less advantageous than the line win or the scatter win. The less advantageous condition of the crest win is not limited to this, and for example, the probability of the crest win occurrence may be lower than the other prizes.

Although illustration is omitted, to determine the normal symbols 501 and the crest symbols 502 which are to be rearranged in the normal game, a symbol random determination table is used. In the symbol random determination table, the normal symbol 501 and the crest symbol 502 for each of the display blocks 28 in each symbol array are associated with a code No., and the code No. is associated with a number range out of 22 number ranges which as a whole covers numbers 0 to 65535.

It should be noted that the above numbers may be divided into ranges equally, or in equally. For example, in the latter case, it is possible to adjust the probability of winning by a random number, based on the type of the normal symbol 501. Further, the "BONUS" corresponding to the trigger symbol 503*b* of the specific symbol 503, or the "WILD" corresponding to the wild symbol 503*a* may be assigned to a narrower range than the ranges assigned to the other types of normal symbols 501. This facilitates adjustment of winning and loss by, for example, making winning of more valuable normal symbol 501 more difficult depending on the status of the game. It is possible to adopt a plurality of symbol random determination tables, according to the gaming situations.

(Display Screen)

An example of the display screen of the lower image display panel 141 in the operation process of the slot machine 10 above will be specifically described.

(Display Screen: Normal Game Screen)

Figure 13:
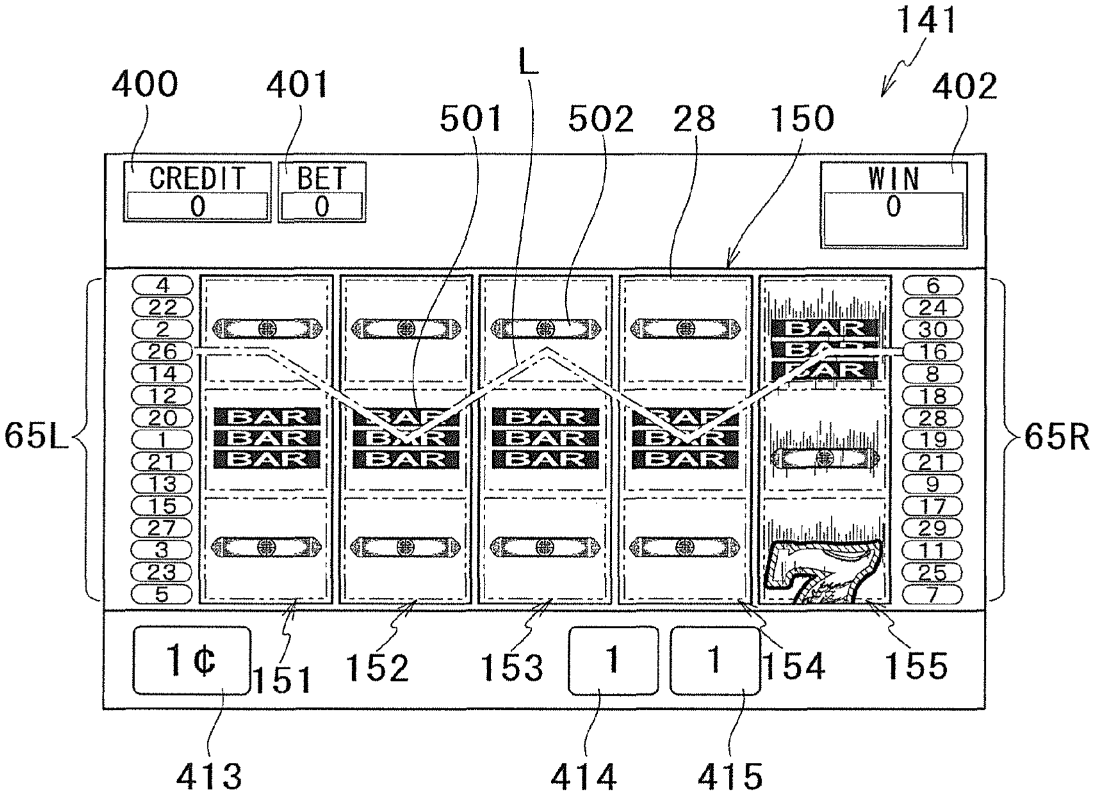
FIG. 13 is an explanatory diagram illustrating an example display screen on a lower image display panel.

FIG. 13 shows an example of a normal game screen which is the display screen of the normal game.

More specifically, the normal game screen has a symbol display region 150 which is provided at the central portion and has five columns of pseudo reels 151 to 155 and active line occurrence parts 65L and 65R which is symmetrically provided to the left and right of the symbol display region 150.

Above the symbol display region 150, a credit meter 400, a bet meter 401, and a win meter 402. The credit meter 400 and the bet meter 401 are displayed at the left edge part when viewed from the player. In the meanwhile, the win meter 402 is provided at the right edge part when viewed from the player.

The credit meter 400 displays the total number of credits (number of remaining credits). The default value is 0. The value is increased and decreased as follows: When "take WIN", which indicates winning in a game, is achieved, the credit won in the game is added to the credit meter. When a game is played, the bet number is subtracted from the credit meter. The bet number is also subtracted when the collect ends. 65R The bet meter 401 displays "Total Bets". When a bet is place for each of the activated lines, the total bet is a bet×the number of lines. The value is re-calculated in each game play. The win meter 402 displays the total obtained credits in an increment manner. The default value is 0. The win meter 402 switchably displays "Line XX Win XX" or "Total Win XX". The display is switched in sync with the display of active line at the time of the occurrence of winning. The content above is displayed after the occurrence of winning. The values are determined based on the active line at the occurrence of winning and the number of credits. Details of the win meter 402 will be given later.

In the meanwhile, below the symbol display region 150 are provided a denomination button 413, a number of lines selection touch button 414, and a bet per line selection touch button 415. These buttons 413, 414, 415 are provided left to right when viewed from the player.

The denomination button 413 displays the current denomination set in the AUDIT. This button is displayed when screens other than the AUDIT are displayed.

The number of lines selection touch button 414 is used for increasing or decreasing the number of active lines. In the present embodiment, this button is arranged not to be touchable because the number of lines is fixed to 50.

The bet per line selection touch button 415 makes it possible to conduct bet per line. When the button is touched, five selection buttons corresponding to the current bet configuration appear.

At the left and right edges of the symbol display region 150, payline occurrence columns 65L and 65R are provided in a symmetrical manner on the left and right. The payline occurrence columns 65L and 65R each has 15 payline occurrence parts.

The payline occurrence parts of the payline occurrence column 65L form pairs with the respective right payline occurrence parts of the payline occurrence column 65R. From the payline occurrence parts of the payline occurrence column 65L to the payline occurrence parts of the payline occurrence column 65R paired with the payline occurrence parts of the payline occurrence column 65L, paylines L are defined in advance. Note that FIG. 12 only illustrates a single payline L for the sake of convenience; however, there are thirty paylines L in the present embodiment.

Each payline L is activated when the payline occurrence parts are connected with each other. In other cases, the paylines are inactive. The number of paylines L active is modifiable within a range of 1 to 30 through operation of the line-number selection touch button 414. The present invention is not limited to this, and the line number may be determined based on the bet amount, or the selectable line numbers may be limited. In the present embodiment, the number of lines is selectable from 1, 5, 9, 20, and 30. The activated payline L establishes various winning combination (line win) related to the symbols 501. The activated payline L may be displayed or may not be displayed.

Figure 14:
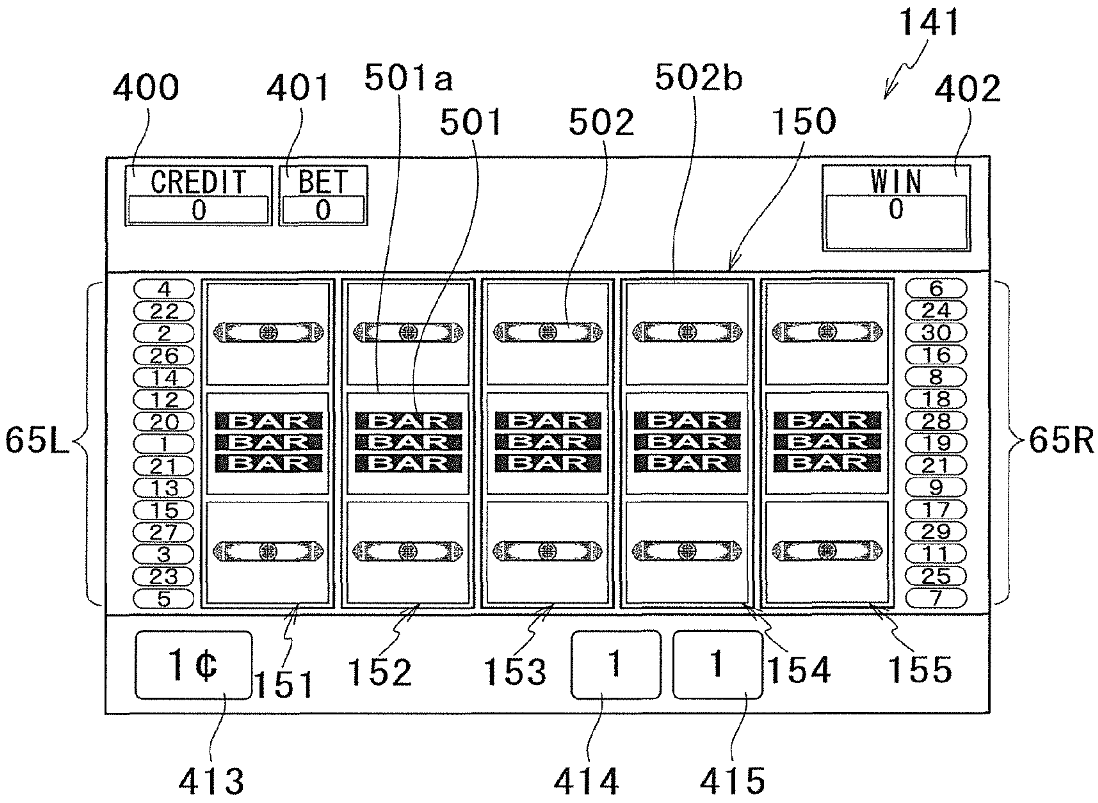
FIG. 14 is an explanatory diagram illustrating an example display screen of the lower image display panel.

FIG. 14 illustrates an example display screen of a game result of the normal game. In this example, the line win and the crest win have occurred as the result of the game. As shown in FIG. 14, when the line win occurs, there is displayed a normal symbol frame 501*a* so as to surround all the normal symbols 501 structuring the winning combination of the line win. Further, when the crest win occurs, there is displayed a crest symbol frame 502*a* so as to surround all the crest symbols 502. The normal symbol frame 501*a* and the crest symbol frame 502*a* are displayed differently.

Figure 15:
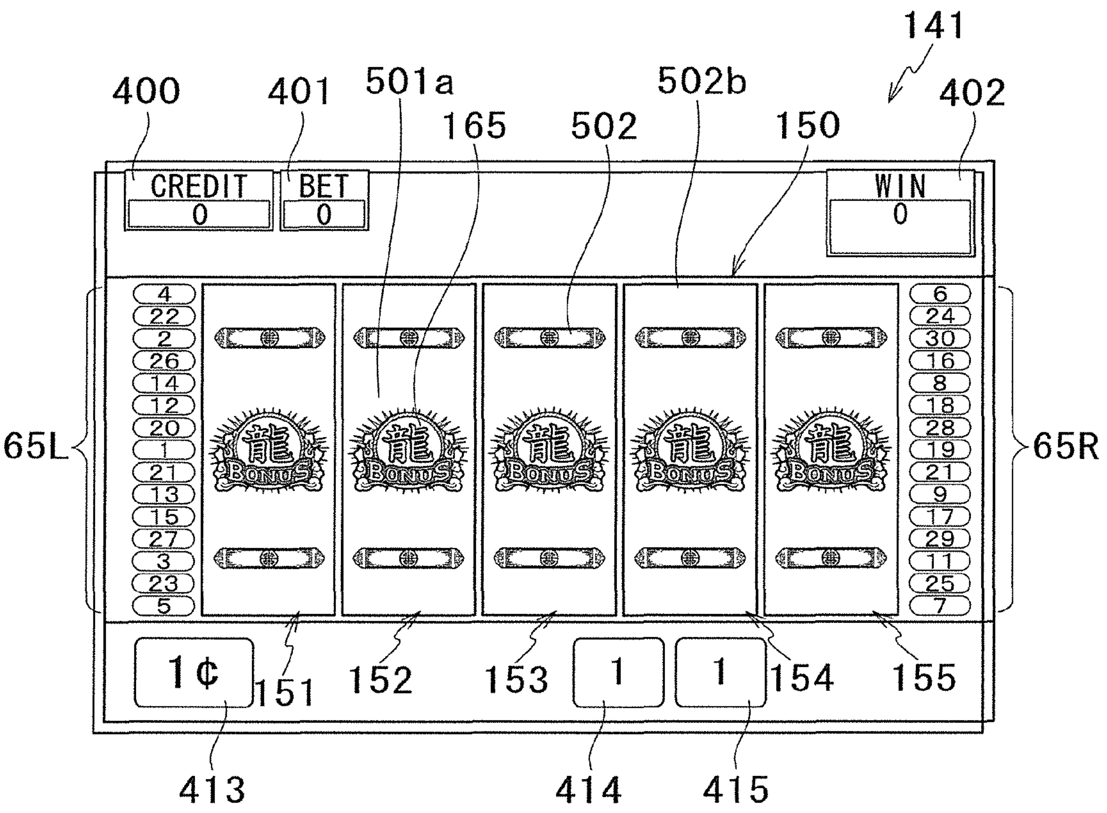
FIG. 15 is an explanatory diagram illustrating an example display screen of the lower image display panel.

FIG. 15 illustrates an example display screen of a game result in the normal game. In this example, the scatter win and the crest win have occurred as the result of the game. As in the foregoing example, when the scatter win occurs, there is displayed a normal symbol frame 501*a* so as to surround all the dragon symbols 165. Further, when the crest win occurs, there is displayed a crest symbol frame 502*a* so as to surround all the crest symbols 502.

Note that displaying of the above game result is not limited to the lower image display panel 141. For example, the game result may be displayed on both the lower image display panel 141 and the upper image display panel 142, or may be displayed only on the upper image display panel 142.

As shown in FIG. 14 and FIG. 15, the crest win occurs when the normal symbols 501 are rearranged only in all the central stages of the symbol display region 150. In other words, when the crest win occurs, there are only five normal symbols 501 rearranged. Thus, there are only three patterns the crest win occurrence, i.e., a pattern in which the line win and the crest win occur, a pattern in which the scatter win and the crest win occur, and a pattern in which only the crest win occurs.

(Display Screen: Bonus Game Screen)

As shown in FIG. 15, the game state shifts to the bonus game, when a predetermined number (five) or more of dragon symbols 165 (trigger symbols 503*b*) are displayed in the symbol display region 150.

Figure 16:
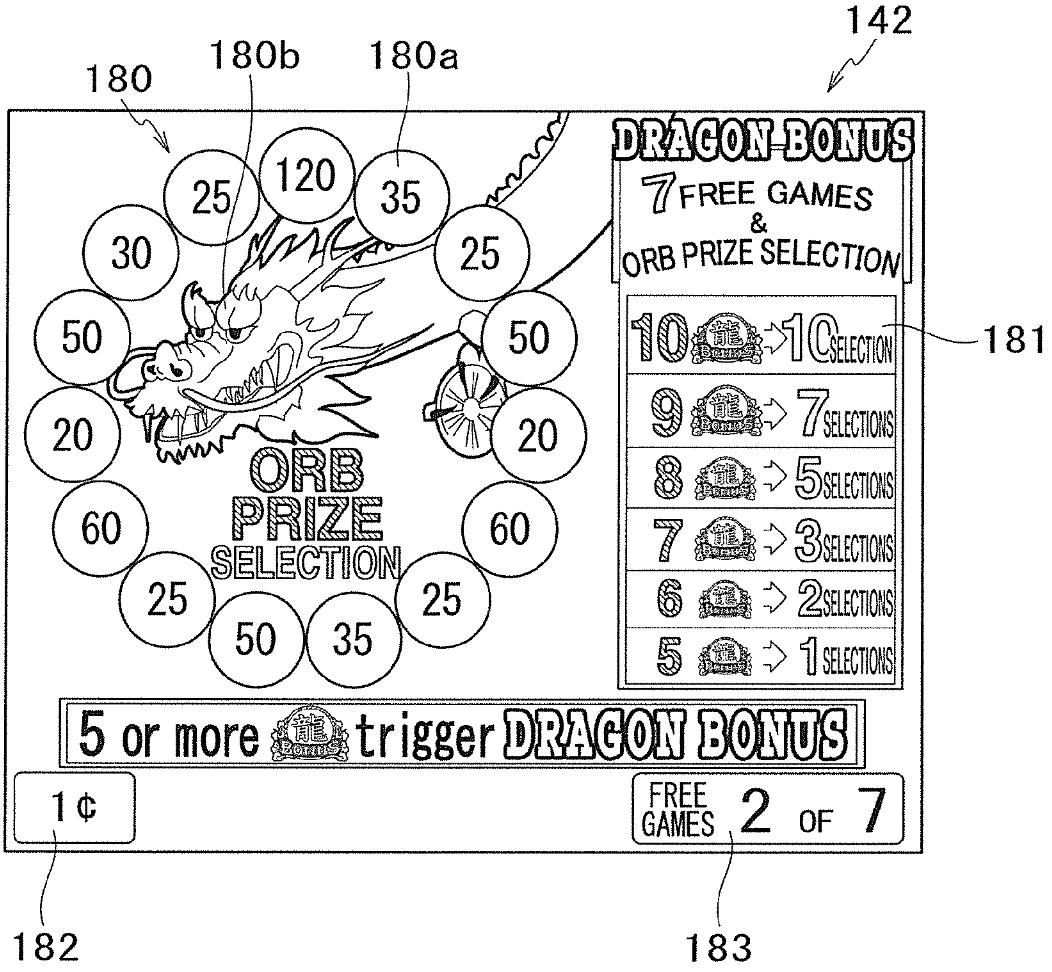
FIG. 16 is an explanatory diagram illustrating an example display screen of the upper image display panel.

As shown in FIG. 16, a roulette screen is displayed on the upper image display panel 142. In the roulette screen, a roulette image 180 is displayed from the center to the left end portion of the upper image display panel 142. The roulette image 180 includes a dragon image 180*a* and obe images 180*b* circularly arranged. The obe images 180*b* are each given a number indicating the payout amount. That is, in the roulette game, a payout corresponding to the number given to the automatically selected obe image 180*b* is awarded to the player.

Further, on the right portion of the upper image display panel 142, a roulette game explanation image 181 is displayed. The roulette game explanation image 181 includes an explanation about the number of times the roulette game is playable. In the present embodiment, the player is able to play the roulette game a certain number of times corresponding to the number of dragon symbols 165 rearranged in the normal game having triggered the bonus game. Specifically, when five dragon symbols 165 are rearranged in the normal game, the player is able to play the roulette game once. When six dragon symbols 165 are rearranged in the normal game, the player is able to play the roulette game twice. When seven dragon symbols 165 are rearranged in the normal game, the player is able to play the roulette game three times. When eight dragon symbols 165 are rearranged in the normal game, the player is able to play the roulette game five times. When nine dragon symbols 165 are rearranged in the normal game, the player is able to play the roulette game seven times. When ten dragon symbols 165 are rearranged in the normal game, the player is able to play the roulette game ten times.

Further, in the lower left part of the upper image display panel 142 is displayed a denomination image 182. The denomination image 182 displays the current denomination set in the AUDIT. Further, in the lower right part of the upper image display panel 142 is displayed a free game counter 183. The free game counter 183 displays the total number of the free games and a counted number. For example, when the free game counter 183 displays "2 OF 7", it means that the free game is executed seven times, and currently the free game has counted up to two.

Figure 17:
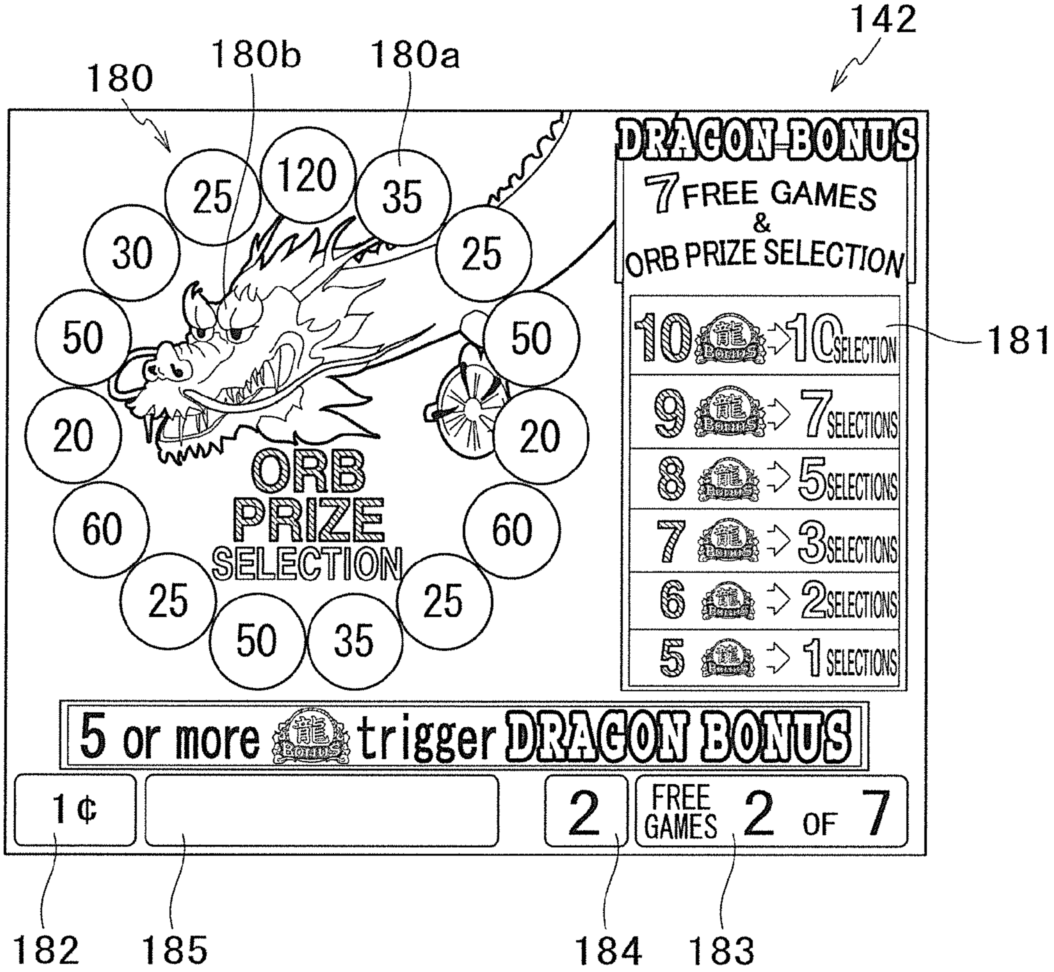
FIG. 17 is an explanatory diagram illustrating an example display screen of the upper image display panel.

Note that, as shown in FIG. 17, in the roulette screen, a free game stock counter 184 which counts the number of stocks of the free game may be displayed. The free game stock counter 184 may be displayed when a free game is stocked. Alternatively, in cases of a gaming machine having no stocking function, the free game stock counter 184 may not be displayed.

The stocking function is a function of stocking a free game that can be executed later. For example, with the stocking function, the free game is stocked when a predetermined number (e.g., five) or more of the dragon symbols 165 are rearranged in the symbol display region 150 during the free game. Note that the value displayed in the free game stock counter 184 may be the actual number of free games. Further, the value displayed in the free game stock counter 184 is the number of sets of the free games, each set including a predetermined number of free games.

Further, as shown in FIG. 17, a message display area 185 may be provided in the lower part of the upper image display panel 142. The message display area 185 is configured to display various messages. For example, the message display area 185 displays a message from outside; e.g., from the center controller 200. Specifically, the message display area 185 displays a message for promotion (general promotional message), a message related to external jackpot information (External jackpot information message), and a message related to system lockup (Lockup pending), and the like. The general promotional message is displayed when the slot machine 10 in the idling state. The External jackpot information message is displayed during the game or while the slot machine 10 is in the idling state. The system lockup means that the slot machine 10 is turned into the idling state by idle signals from outside. From reception of the idle signals to the beginning of the idling state, the message display area 185 displays a message indicating that the slot machine 10 will enter the idling state. Whether to display or not display these messages during the idling state or during the game is controlled by the on/off state of a display flag set in advance for each type of the message in the slot machine 10. Further, these messages are each approximately 16 to 30 characters; e.g., 22 characters or the like (maximum 80 bytes). Further, in cases of displaying multiple messages in steps in the message display area 185, each message is displayed for at least four seconds. The position of the message display area 185 is not limited to the lower part (default position) of the upper image display panel 142, and may be displayed in different positions according to the messages. For example, the message display area 185 may contain semi-transparent text and may be overlapped with the symbol display region 150. Further, such a significant display may be set in advance by means of a flag in the slot machine, or may be set in signals containing an external message.

(Display Screen: Win Screen)

Figure 18:
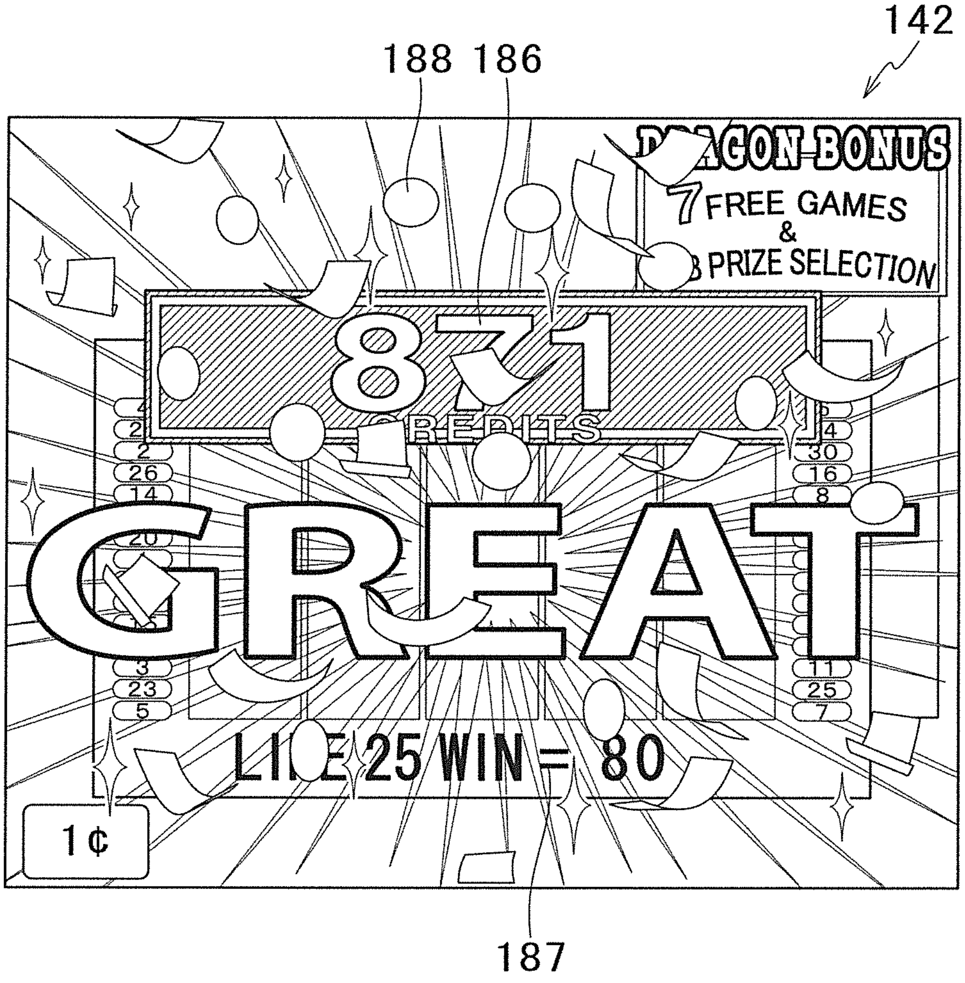
FIG. 18 is an explanatory diagram illustrating an example display screen of the upper image display panel.
Figure 19:
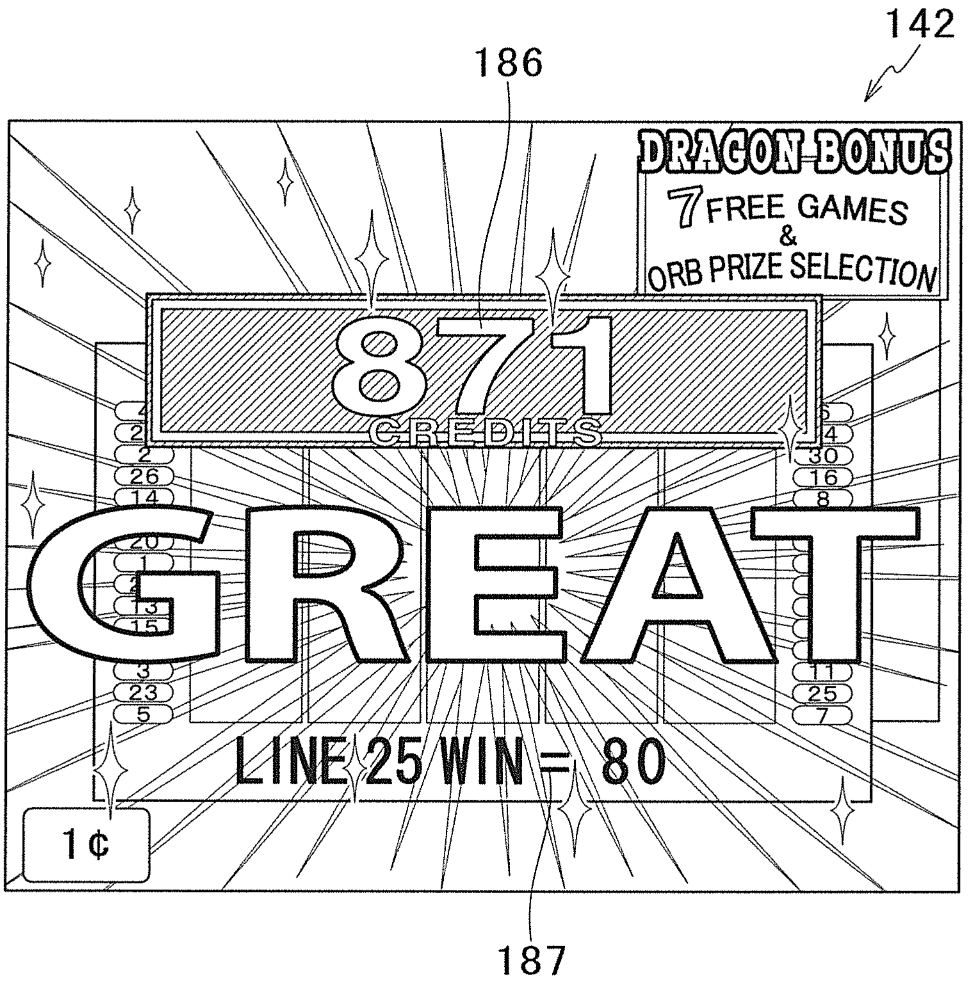
FIG. 19 is an explanatory diagram illustrating an example display screen of the upper image display panel.

The following describes screens on the upper image display panel 142, when a prize occurs. When a prize such as the line win occurs in the normal game, a normal game win screen is displayed on the upper image display panel 142 as shown in FIG. 18. In the normal game win screen, a normal payout image 186, a normal game win occurrence image 187, and decorative image 188, and the like are displayed. The normal payout image 186 is an image indicating the total payout in the normal game in which a prize has occurred. The win occurrence image 187 is an image in which the prize occurred and its payout are successively indicated. The decorative image 188 is an image with a design suggesting a bill or a coin, and is displayed on the entire upper image display panel 142. Note that as shown in FIG. 19, the normal game win screen may be such that the decorative image 188 is not displayed.

Figure 20:
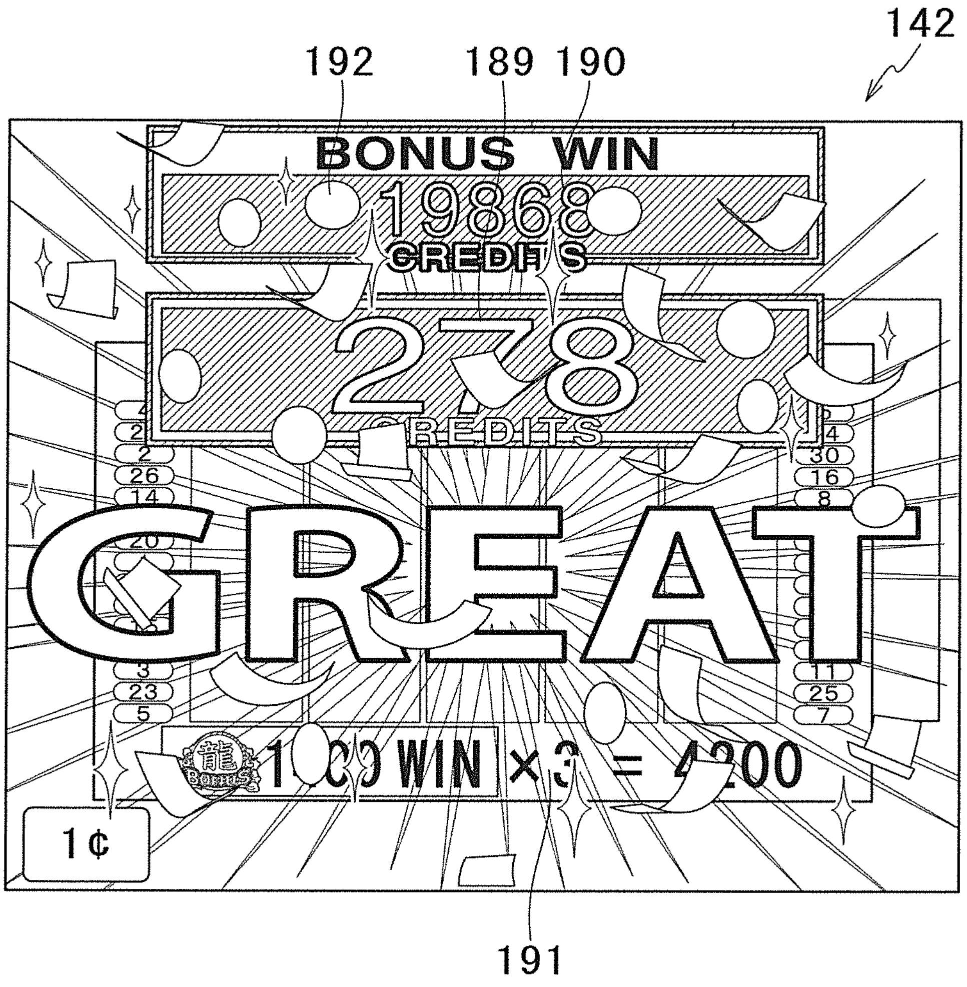
FIG. 20 is an explanatory diagram illustrating an example display screen of the upper image display panel.
Figure 21:
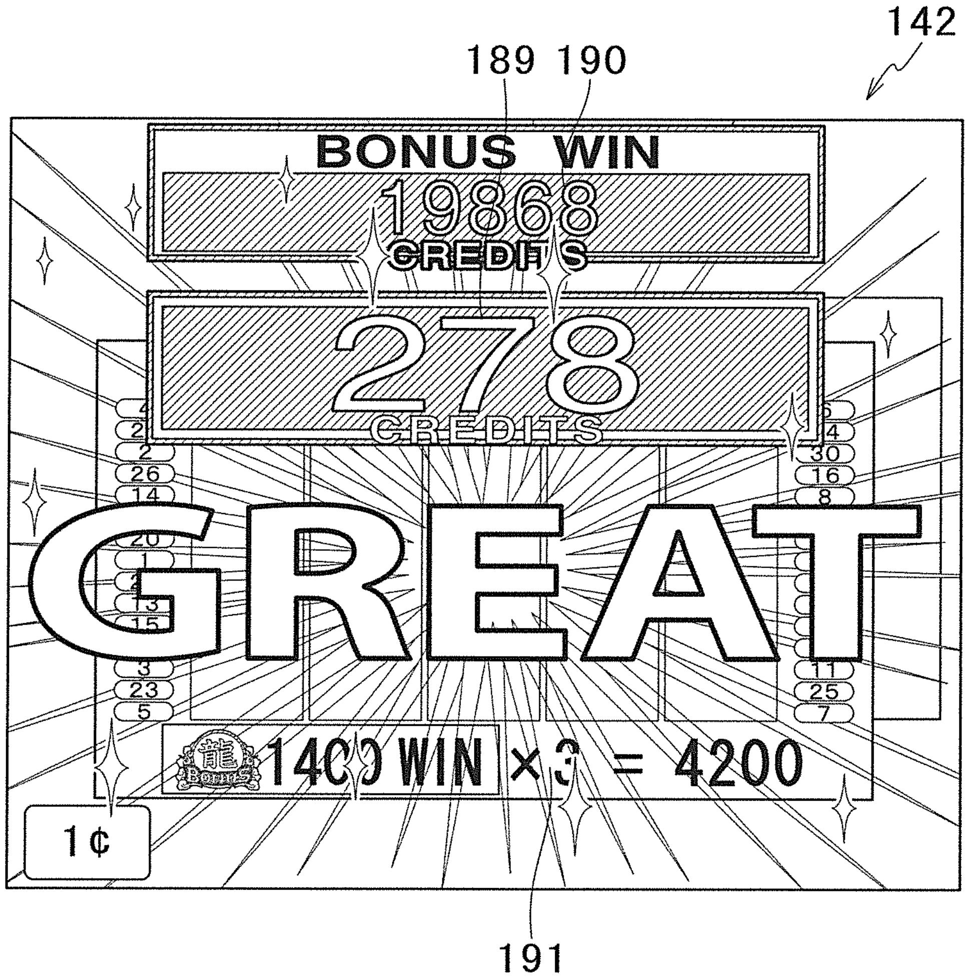
FIG. 21 is an explanatory diagram illustrating an example display screen of the upper image display panel.

Further, when a prize such as the line win occurs in the free game in the bonus game, a free game win screen is displayed on the upper image display panel 142, as shown in FIG. 20. In the free game win screen, a free game payout image 189, a free game total payout image 190, a free game win occurrence image 191, a decorative image 192, and the like are displayed. The free game payout image 189 is an image indicating the total payout in a single free game in which the prize occurred. The free game win occurrence image 191 is an image in which the prize occurred and its payout are successively indicated. The free game total payout image 190 is an image indicating the total payout having won in the entire bonus game. The decorative image 192 is an image with a design suggesting a bill or a coin, and is displayed on the entire upper image display panel 142. Note that as shown in FIG. 21, the normal game win screen may be such that the decorative image 192 is not displayed.

Figure 22:
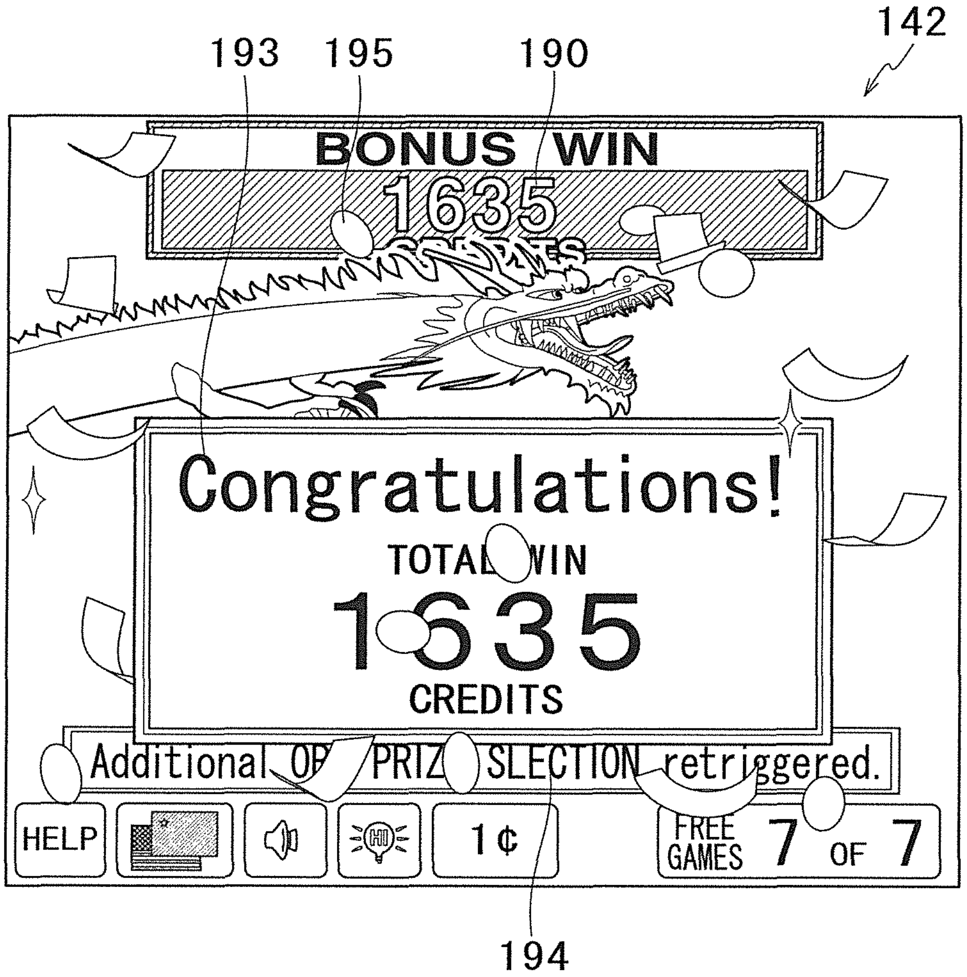
FIG. 22 is an explanatory diagram illustrating an example display screen of the upper image display panel.
Figure 23:
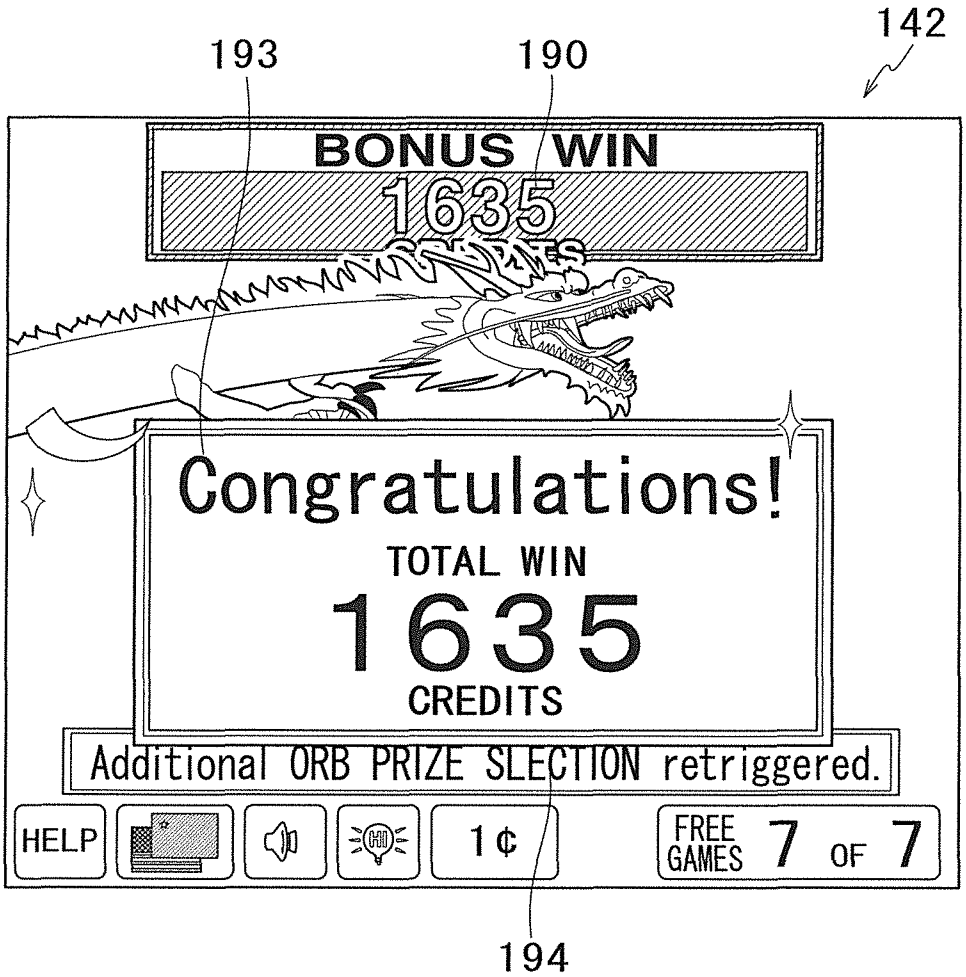
FIG. 23 is an explanatory diagram illustrating an example display screen of the upper image display panel.

Further, at the end of the bonus game, a bonus game result display screen is displayed as shown in FIG. 22. In the bonus game result display screen, displaying of the foregoing free game total payout image 190 is continued, and a bonus game result image 193, a retrigger image 194, and a decorative image 195, and the like are further displayed. The bonus game result image 193 is an image indicating the total payout obtained in all of the roulette games and the free games of the bonus game. The retrigger image 194 is an image which is displayed when a retrigger occurs in the free game, and the bonus game can be executed again. The decorative image 195 is an image with a design suggesting a bill or a coin, and is displayed on the entire upper image display panel 142. Note that as shown in FIG. 23, the normal game win screen may be such that the decorative image 195 is not displayed.

(Display Screen: Other Screens)

Figure 24:
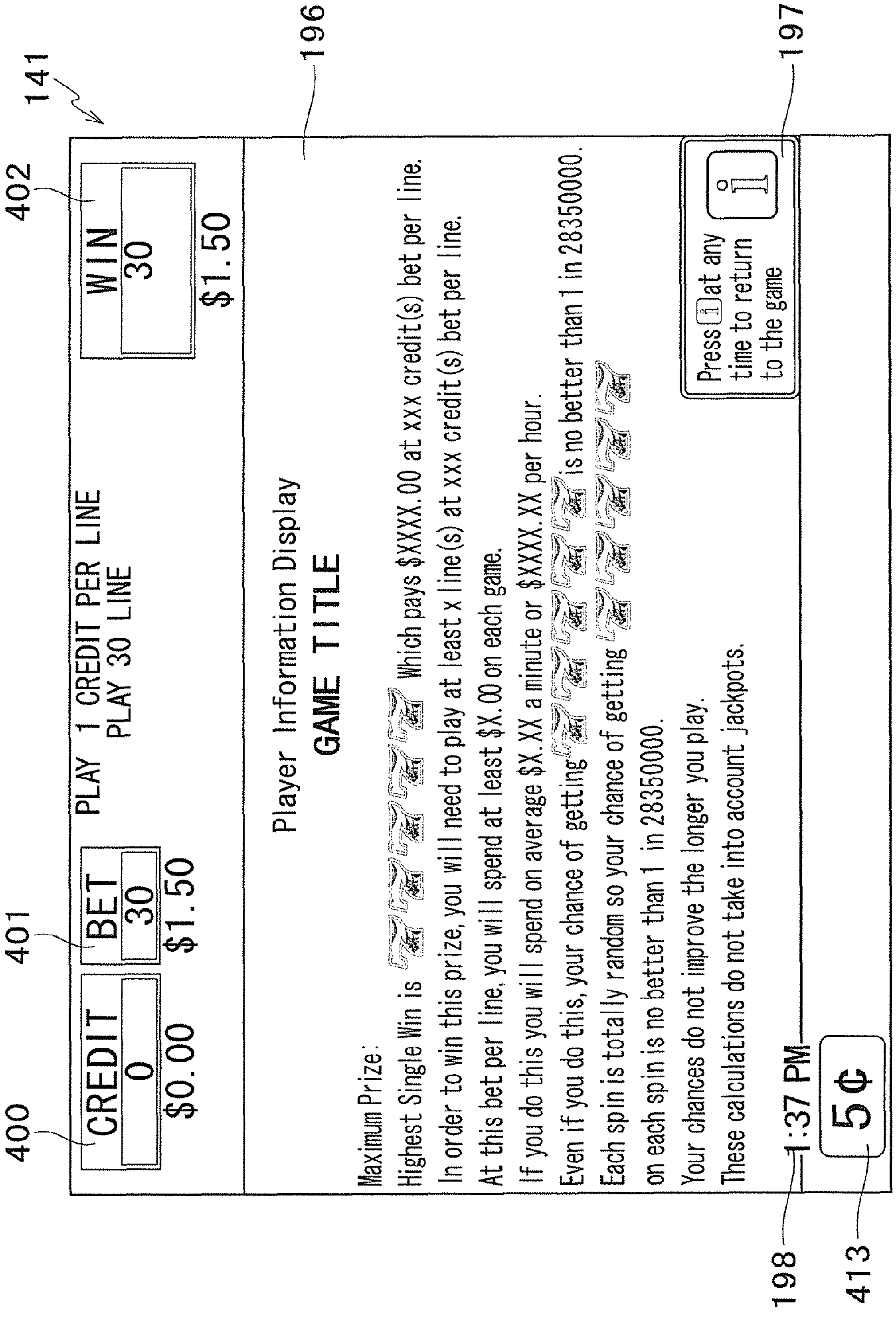
FIG. 24 is an explanatory diagram illustrating an example display screen of the lower image display panel.

When the information button 45 of the control panel 30 is operated, a player information display image 196 is displayed on the lower image display panel 141 as shown in FIG. 24. The player information display image 196 displays information related to the winning combination and its payout, and the like. Further, when the information button 45 of the control panel 30 is operated while the player information display image 196 is displayed, the original game screen comes back. Further, in the lower right part of the lower image display panel 141 is displayed an information icon image 197. The information icon image 197 shows an icon indicting the information button 45, and indicates that the original game screen comes back when the information button 45 is operated. It should be noted that the player information display image 196 is arranged in an area different from those of the credit meter 400, the bet meter 401, the win meter 402, and the denomination button 413, and is displayed so that these images 400 to 402, and 413 are visible. Further, in the lower left part of the lower image display panel 141 is displayed a clock image 198 indicating the current time. The player information display image 196 may display the information received from the center controller 200 and the like, and if such information is not received, the information button 45 may be turned inactive and the LED of the information button 45 may be turned off.

Figure 25:
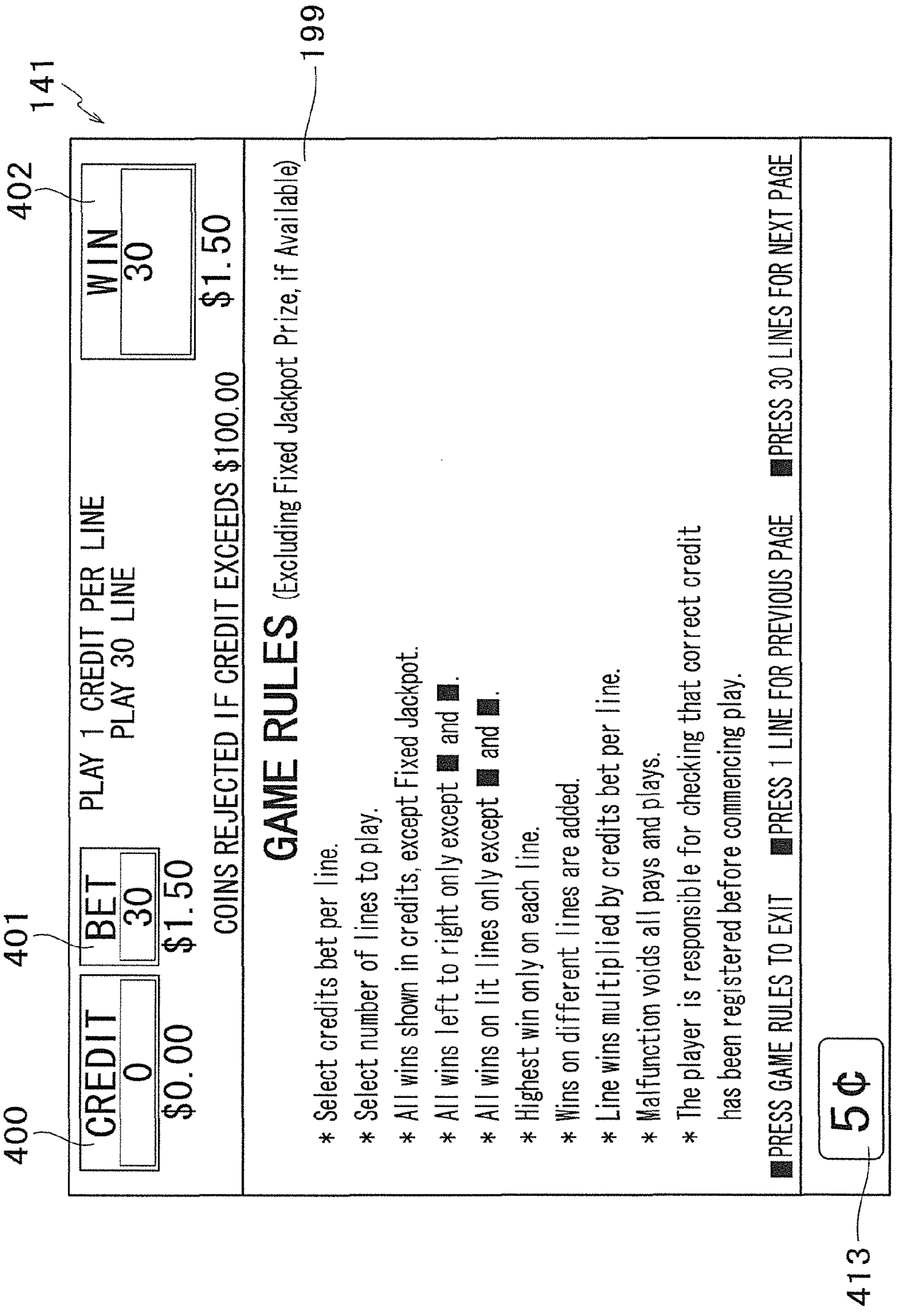
FIG. 25 is an explanatory diagram illustrating an example display screen of the lower image display panel.

When the game rule button 33 is operated while the player information display image 196 is displayed, a game rule image 199 is displayed as shown in FIG. 25. When the information button 45 is operated while the game rule image 199 is displayed, a screen displaying the foregoing player information display image 196 appears.

(Operations of Slot machine 10: Normal Game Execution Process)

Figure 26:
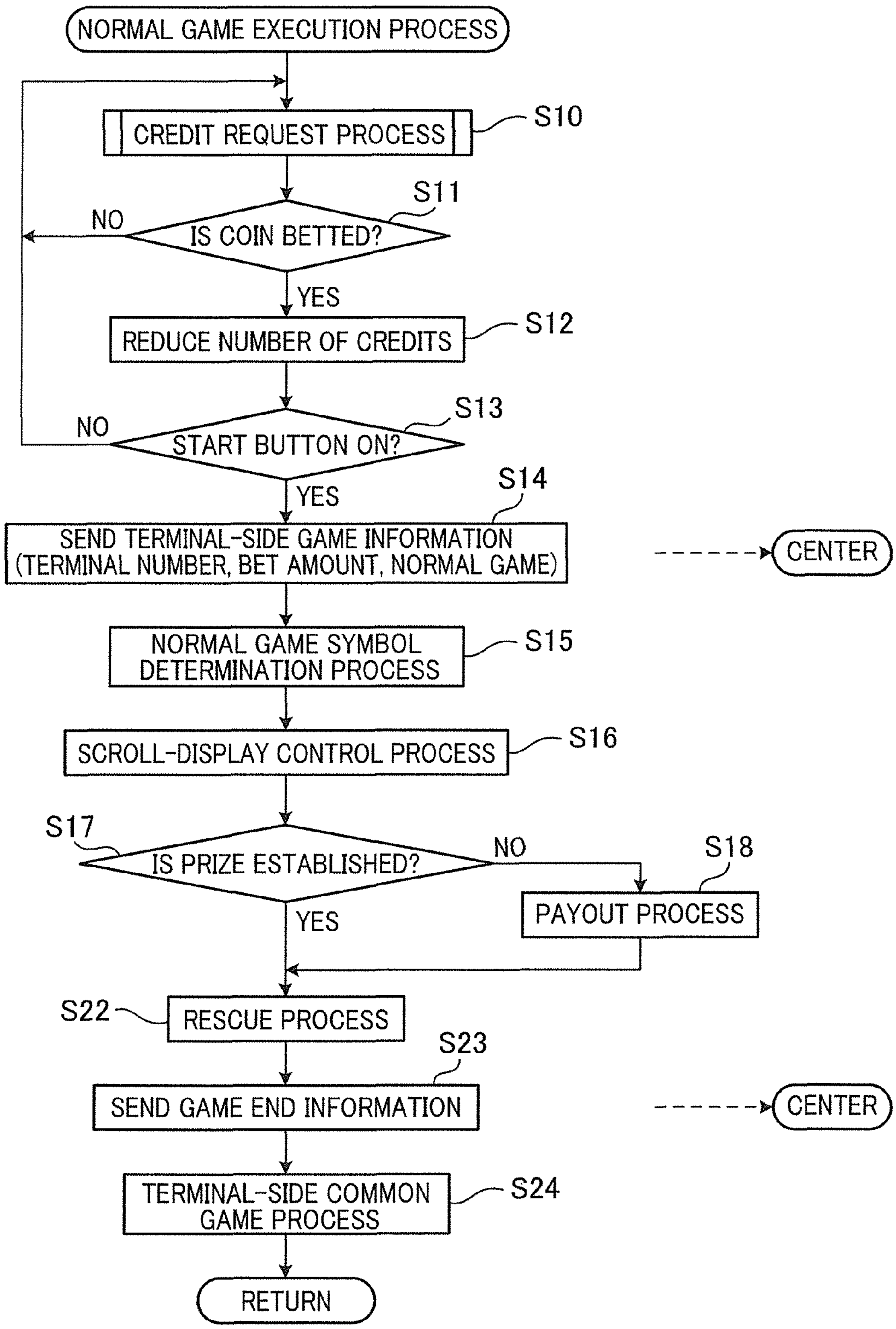
FIG. 26 is a flowchart of a normal game execution process.

The operation of the slot machine 10 arranged as above will be described. The normal game execution process shown in FIG. 26 is executed by the main CPU 71 of the slot machine 10. The slot machine 10 has been activated in advance.

To begin with, the main CPU 71 executes a credit request process (S10). In this process, the player determines how many credits are used from the credits stored in the IC card.

Then whether a coin is bet is determined (S11). In this process, the main CPU 71 determines whether an input signal output from the 1-BET switch 34S when the 1-BET button is pressed and an input signal output from the 10-BET switch 39S when the 10-BET button 39 is pressed are received. When it is determined that no coin is bet, the process goes back to S10.

In the meanwhile, if it is determined in S11 that a coin is bet, the main CPU 71 executes a process of decreasing the number of credits stored in the RAM 73 in accordance with the number of coins bet (S12). When the number of coins bet is larger than the number of credits stored in the RAM 73, the step of decreasing the number of credits stored in the RAM 73 is not carried out and the process goes back to S11. When the number of coins bet is larger than the maximum number (maximum bet amount in the present embodiment) of coins on one game, the step of decreasing the number of credits stored in the RAM 73 is not carried out and the process proceeds to S13.

Then the main CPU 71 determines whether the spin button 46 is pressed (S13). In this step, the main CPU 71 determines whether an input signal output from the spin switch 46S when the spin button 46 is pressed is received. When it is determined that the spin button 46 is not pressed, the process goes back to S11. It is noted that, when the spin button 46 is not pressed (e.g., when an instruction to end a game is input while the spin button 46 is not pressed), the main CPU 71 cancels the reduction result in S12.

In the meanwhile, if it is determined in S13 that the spin button 46 is pressed, the main CPU 71 sends terminal-side game information to the center controller 200 (S14), and then executes a normal game symbol determination process (S15). In the normal game symbol determination process, code numbers when the symbols are stopped are determined. More specifically, a random number is sampled, and the code number when each symbol array of the display block 28 stops is determined based on the sampled random number and a normal game symbol table. Then, based on the determined symbols, there is determined whether to execute the indication effect.

Thereafter, in S16, the main CPU 71 executes a scroll display control process. In this process, the display control is conducted so that, after the start of the scroll of the normal symbols 501 and the crest symbols 502, the normal symbols 501 and the crest symbols 502 are rearranged in accordance with S15. When an indication effect (common indication effect, and individual indication effect) is to be executed, display control of scrolling and the like of the normal symbols 501 and the crest symbols 502 is executed, and the indication effect is executed.

Thereafter, the main CPU 71 determines whether a prize is established (S17). In S17, the main CPU 71 counts, regarding the normal symbols 501 rearranged in accordance with S16, the number of normal symbols 501 of each type rearranged on each active line. Then the main CPU 71 determines whether the number of the normal symbols of each type is at least three. It should be noted that the main CPU 71 counts the dragon symbols 165 rearranged in the symbol display region 150, and determines if the count is five or more. Further, the main CPU 71 counts the number of the crest symbols 502 rearranged in the symbol display region 150, and determines if the count is ten or more.

When it is determined that a prize is established, the main CPU 71 executes a step concerning the payout of coins (S18). In this step, the main CPU 71 determines a payout rate with reference to odds data stored in the RAM 73 and based on the number of normal symbols 501 rearranged on an active line. The odds data indicates the relationship between the number of normal symbols 501 rearranged on an active line and a payout rate. Each time one "Wild" is displayed on an active line where winning is established, the payout is doubled. That is to say, when three "Wild" are displayed on an active line where winning is established, the payout is multiplied eight times.

When it is determined in S17 that no prize is established or after S18, the main CPU 71 executes a rescue process to relieve the player if a predetermined rescue execution condition has been established (S22). After S22, the main CPU 71 sends game end information as information to cause all slot machines 10 to simultaneously start the common game (S23). Thereafter, a terminal-side common game process is executed (S24). The sub routine ends with this.

In addition to the above, the gaming machine 1 may be structured as follows.

(Details of Display Screen: Win Meter 402)

Figure 27:
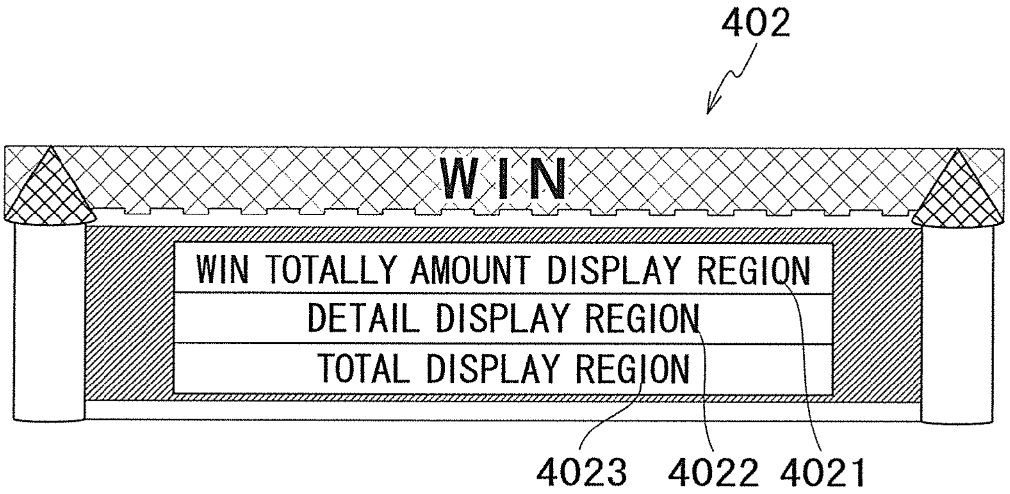
FIG. 27 illustrates a WIN meter.
Figure 30:
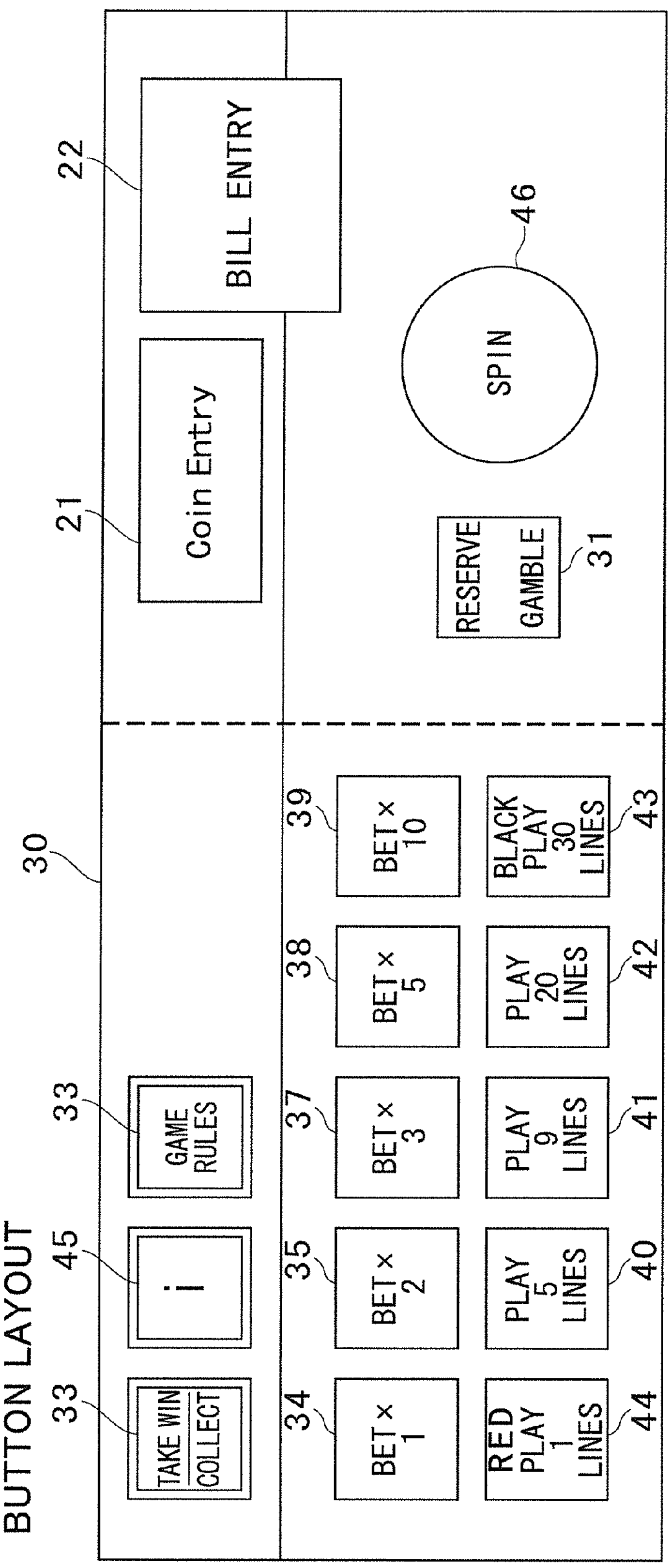
FIG. 30 is a frontal view of the control panel.

As shown in FIG. 27, the win meter 402 displays an obtained credit and the details thereof in an integrated meter, when a winning is achieved. The win meter 402 includes a WIN totally amount display region 4021, a detail display region 4022, and a total display region 4023.

(Details of Display Screen: Win Meter 402: WIN Totally Amount Display Region 4021)

The WIN totally amount display region 4021 displays the obtained credit and money. Details of the image displays will be described below. In the idle state, the total amount of winning displayed is "0" immediately after the winning, and "0" is continuously displayed thereafter. When the spin button 46 is pressed, "0" is displayed. The increment display is executed during the WIN increment. "0" is displayed during a bonus pick trigger (because no winning is achieved during the trigger).

At the introduction of the free game, the total amount of immediately preceding winning is displayed. The total amount of immediately preceding winning is displayed during the rotation of the reels in the free game. At the moment immediately after the rotation of the reels and immediately after the winning in the free game, the winning achieved in the free game is added to the total amount of the preceding winning, and the increment display is carried out.

In other cases, the total amount of the winning in the immediately preceding game is displayed. At the introduction of a bonus, the total amount of the immediately preceding winning is displayed. Immediately after the end of the bonus, the credits obtained in a bonus or jackpot are added to the total amount of immediately preceding winning, and the increment display is carried out.

For example, credit display such as "12345678" is displayed on the upper stage, and money display such as "$123, 456, 78" is displayed in the lower stage.

(Details of Display Screen: Win Meter 402: Detail Display Region 4022)

The detail display region 4022 displays the number of the winning line and the WIN credit after the stop of the fifth reel, when winning is achieved in the normal game or the free game. When more than one line payout simultaneously occurs, the line payouts are displayed one by one at intervals of 0.5 second. The line payouts are serially displayed from the winning line having the smallest number, and the one having the smallest number is displayed again after the one having the largest number is displayed. The detail display region 4022 displays a text string "bonus WIN" and WIN credits in case of winning with a bonus and credit payout. Furthermore, the detail display region 4022 displays a text string "jackpot WIN" and WIN credits in case of obtaining a bonus in the jackpot.

Details of the display screen will be given below. In case of immediately after a normal winning in the idle state, the detail of the payout is displayed. When there are more than one payout, the details of the payouts are switched at intervals of 0.5 second. Nothing is displayed in other cases. Furthermore, nothing is displayed when the spin button 46 is pressed. Detail of the payout is displayed during the WIN increment. When there are more than one WIN increment, the WIN increments are switched at intervals of 0.5 second. Furthermore, nothing is displayed at the time of a bonus pick trigger. Furthermore, nothing is displayed at the time of the introduction of a free game. Furthermore, nothing is displayed during the rotation of the reels in a free game. When a line winning exists immediately after the stop of the reels in a free game, the detail of the payout is displayed. When there are more than one payout, the details of the payouts are switched at intervals of 0.5 second. Nothing is displayed in other cases.

Nothing is displayed at the time of the introduction of a bonus. When a bonus (excluding jackpot) exists immediately after the end of the bonus, a bonus WIN is displayed, and a jackpot WIN is displayed when the jackpot is achieved. The bonus WIN is displayed immediately after achieving a credit payout. Nothing is displayed at the end of a bonus game (i.e., when returning to the game screen).

An example of the displayed image is "line xx WIN=12345678". This image display indicates a winning in a normal game or in a free game. Another example of the displayed image is "bonus WIN=12345678". This image display indicates a winning of a bonus or a credit payout. Another example of the displayed image is "jackpot WIN=12345678". This image display indicates a winning at the time of obtaining jackpot in a bonus.

(Details of Display Screen: Win Meter 402: Total Display Region 4023)

The total display region 4023 displays the sum total of the amounts in the detail display region. Details of the image displays will be given below. The total winning is displayed in case of immediately after a normal winning in the idle state. Nothing is displayed in other cases. Nothing is displayed when the spin button 46 is pressed. The total winning is displayed during the WIN increment. Nothing is displayed at the time of a bonus pick trigger. Furthermore, nothing is displayed at the time of the introduction of a free game. Furthermore, nothing is displayed during the rotation of the reels in a free game. When a line winning exists immediately after the stop of the rotation of the reels in a free game, the total winning is displayed. Nothing is displayed in other cases. Nothing is displayed at the introduction of a bonus. The total winning is displayed immediately after the end of a bonus. The total winning is displayed immediately after winning a credit payout. Nothing is displayed at the end of a bonus game (i.e., returning to the game screen). An example of the displayed image is "total WIN=12345678".

(Details of Display Screen: Win Meter 402, Progressive Meter: Increment Spec)(Basic Specification)

The count up is smoothly carried out upward. The control is executed in consideration of a difference between an actual amount of money (real amount of money) and an amount of money displayed at that time (displayed amount of money). The operation of the carry of a digit is done at the same time as the operation for lower digits. When a displayed amount of money is larger than a real amount of money (e.g., at the time of resetting in response to a winning), rewriting is immediately carried out.

(Details of Increment Operation)

The speed of the increment is determined in accordance with a remaining count number. When the remaining count number is increased during the operation, the speed of the increment is immediately changed to correspond to the increased remaining count number. The rewriting is performed when the remaining count number exceeds "101". More specifically, as shown in FIG. 28, the increment operation is carried out at a speed of increment (seconds) corresponding to each remaining count number.

(Details of Rewriting)

When the remaining count number exceeds "101", the rewriting is carried out with the value (remaining count number—60), and the count up is carried out based on a data table for the remaining 60 counts. For example, when the remaining count number is 110 counts, the target amount is rewritten so that 50 counts calculated by subtracting 60 from 110 are added to the target amount. At the same time as the rewriting, the remaining 60 counts are counted up. In the meanwhile, when the display amount becomes larger than the real amount due to resetting on account of progressive winning or the like, rewriting is immediately carried out. It is noted that the numbers above such as "101" and "60" are mere examples, and "101" may be any predetermined number and "60" may be any number to be subtracted.

When a progressive winning occurs, the increment is interrupted, the rewriting to the amount of money having been won is carried out, and a flickering effect starts. The flickering is not performed while the increment is being interrupted.

The speed of increment may be managed based on the ratio between the bet and the amount won. For example, when an amount won by winning is four times larger than a bet, the speed of the increment is set at four seconds with reference to the relationship between control thresholds and seconds defined in, for example, a data table shown in FIG. 29. Furthermore, after the speed of the increment is determined based on the data table of FIG. 29, the data table of FIG. 28 may be rewritten based on the determined value. For example, when the speed of the increment is determined to be four seconds in the case where an amount won by winning is four times larger than the bet as above, the second for the remaining count number (1 to 2) in the data table of FIG. 53 is set at four seconds, and the other remaining count numbers are changed to values calculated based on a predetermined ratio.

(Control Panel 30)

Below the lower image display panel 141, as shown in FIG. 71, a control panel 30 is provided. The control panel 30 is provided not only with buttons but also units such as a coin entry 21 that allows coins to enter the cabinet 11 and a bill entry 22.

More specifically, on the control panel 30, a take-win/collect button 32, an information button 45([i] button), a game rule button 33 are provided on the upper stage of the left area in front elevation, a 1-BET button 34, a 2-BET button 35, a 3-BET button 37, and a 5-BET button 38 are provided in the middle stage of the left area. Furthermore, on the control panel 30, a play-1-line button 44, a play-5-lines button 40, a play-9-lines button 41, a play-20-lines button 42, and a play-30-lines button 43 are provided in the lower stage of the left area. The control panel 30 has the reserve/gamble button 31 and the spin button 46 in the lower part of the right side area. It is noted that, as shown in FIG. 114 to FIG. 117, the control panel 30 may have a different design of buttons in accordance with the type of the game.

The control panel 30 makes it possible to conduct selections in the same manner as those by the touch panel, on various types of selection screens. For example, the cursor is moved leftward as the 1-BET button 34 is touched, and the cursor is moved rightward as the 10-BET button 39 is touched. When the operation is carried out, the light source in each button is preferably turned on.

The reserve/gamble button 31 is used when a player leaves the machine or when the player asks a staff person of the gaming facility to exchange money. The reserve/gamble button 31 is an operation button used for, for example, shifting to the gamble game after the end of the bonus game or the like. The gamble game is a game played with the consumption of an obtained credit. The take-win/collect button is a so-called settlement button by which credit data concerning credits obtained in games is added to the credit data stored in an IC card inserted into the PTS terminal 700. The game rule button 33 is pressed when, for example, it is unclear how to play a game. As the game rule button 33 is pressed, various help information is displayed on a later-described effect mechanism 131 and lower image display panel 141.

Each time the 1-BET button 34 is pressed, one of the credits currently owned by the player is bet on each active line. The 2-BET button 35 is used to start a game with two credits bet on each active line. The 3-BET button 37 is used to start a game with three credits bet on each active line. The 5-BET button 38 is used to start a game with five credits bet on each active line. The 10-BET button 39 is used to start a game with ten credits bet on each active line. As such, the number of credits bet on each active line determined by pressing the 1-BET button 34, the 2-BET button 35, the 3-BET button 37, the 5-BET button 38, and the 10-BET button 39. It should be noted that the designs of the buttons for betting may be modified according to the modification of the bet amount that can be bet. For example, it is possible to provide bet buttons which enable betting of credits “1”, “2”, “3”, “4”, and “5”. In this case, the designs of the bet buttons may be “BET×1”, “BET×2”, “BET×3”, “BET×4”, and “BET×5”, respectively. Further, for example, it is possible to provide bet buttons which enables betting of credits “1”, “2”, “5”, “10”, and “15”. In this case, the designs of the bet buttons may be “BET×1”, “BET×2”, “BET×5”, “BET×10”, and “BET×15”, respectively. Further, for example, it is possible to provide bet buttons which enables betting of credits “1”, “2”, “5”, “10”, and “20”. In this case, the designs of the bet buttons may be “BET×1”, “BET×2”, “BET×5”, “BET×10”, and “BET×20”, respectively.

The play-1-lines button 44 is pressed for activating one active line. As a result, the number of active lines activated becomes one. The play-5-lines button 40 is pressed for activating five active lines. As a result, the number of active lines activated becomes five. The play-9-lines button 41 is pressed for activating nine active lines. As a result, the number of active lines activated becomes nine. The play-20-lines button 42 is pressed for activating twenty active lines. As a result, the number of active lines activated becomes twenty. The play-30-lines button 43 is pressed for activating thirty active lines. As a result, the number of active lines activated becomes thirty.

The spin button 46 is a button used for starting the scroll of the symbol array having the normal symbols 501 and the crest symbols 502. This spin button 46 also functions as a button for starting a bonus game and for adding a payout awarded in a bonus game to the credits. It should be noted that, if game start with the same betting conditions as the previous game (bet amount, activated line number) is possible by the spin button 46, the design of the spin button 46 may be “REPEAT BET”. The coin entry 21 is used for receiving coins into the cabinet 11. The bill entry 22 validate bills and receives genuine bills into the cabinet 11.

(Operations of Slot Machine 10: Gamble Game)

Figure 31:
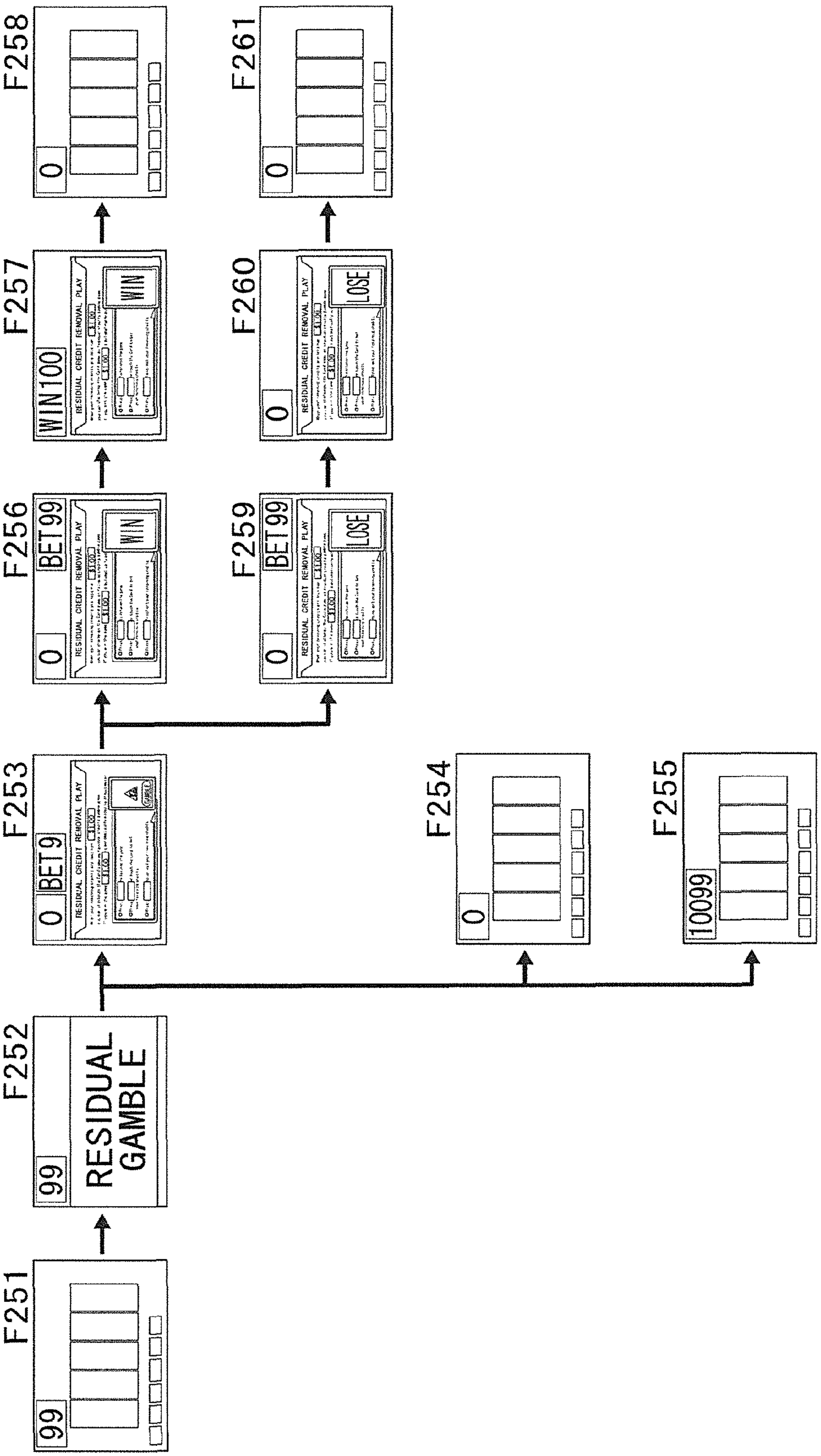
FIG. 31 is a flowchart of a gamble game.

As shown in FIG. 31, when the money is lower than the processable value such as one dollar, a “RESIDUAL GAMBLE” screen is displayed if a gamble start condition such as the pressing of a collect button is satisfied (F253). When the gamble button is pressed, Gamble starts. On the other hand, when the collect button is pressed, Call Attendant is displayed (F254). When the spin button 46 is pressed, the screen of the normal game comes back (F255).

When “WIN” is achieved in Gamble (F256), a predetermined amount of money such as one cent is awarded and a token is paid out through the hopper. In addition to the above, the addition to the credit meter is executed (F257). Thereafter, after a predetermined time such as two seconds elapses, the screen of the normal game comes back (F258). On the other hand, when “LOSE” appears in Gamble (F259), a LOSE screen is displayed (F260). Thereafter, after a predetermined time such as two seconds elapses, the screen of the normal game comes back (F261).

The roles of the buttons in the progress of the gamble game will be described. In the take-win/collect button 32, GAMBLE ON corresponds to “TAKE WIN” and GAMBLE OFF corresponds to “TAKE WIN”. In the gamble button 44, GAMBLE ON corresponds to “Gamble Start” and GAMBLE OFF corresponds to “–”. In the BET button, GAMBLE ON corresponds to “Invalidated” and GAMBLE OFF corresponds to “Gamble Start”. In the spin button 46, GAMBLE ON corresponds to “To Normal Game” and GAMBLE OFF corresponds to “To Normal Game”.

Figure 32:
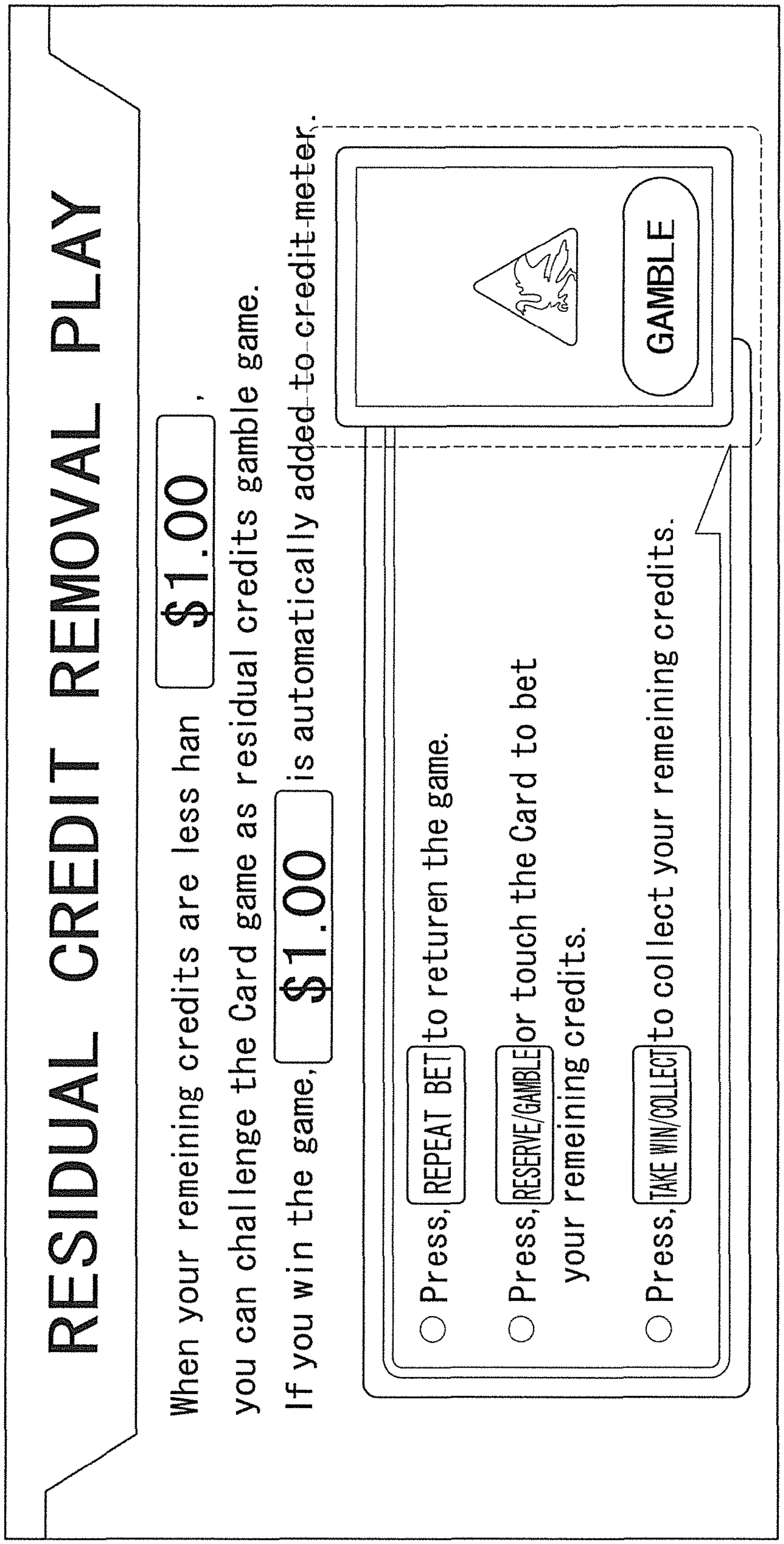
FIG. 32 illustrates a screen in a gamble game.

As shown in FIG. 32, the “RESIDUAL GAMBLE” screen has a card display area, a navigation area, and a meter area. In the card area is displayed a card image. The entirety of the card area has a touch sensor function. On the navigation area, various navigation texts are displayed.

The limit of the value winnable in Gamble is set in the AUDIT. The maximum number of times of Gamble is also set in the AUDIT. For example, the maximum number of times is set at five and the number of times of Gamble is set so as to be five or lower. Whether the touch panel can be used is switchable in some countries.

As shown in FIG. 33, when the shifting to the gamble game occurs, the message “PLAY ON, GAMBLE or TAKE WIN RED” disappears. Immediately after the clearance of the RAM, the card history is empty until the gamble game is played. A message “SELECT RED OR BLACK OR TAKE WIN” is displayed. In the gamble screen, a heart-shaped red button and a spade-shaped black button are turned on and a TAKE WIN button at the center is turned on. The other buttons are turned off.

Figure 34:
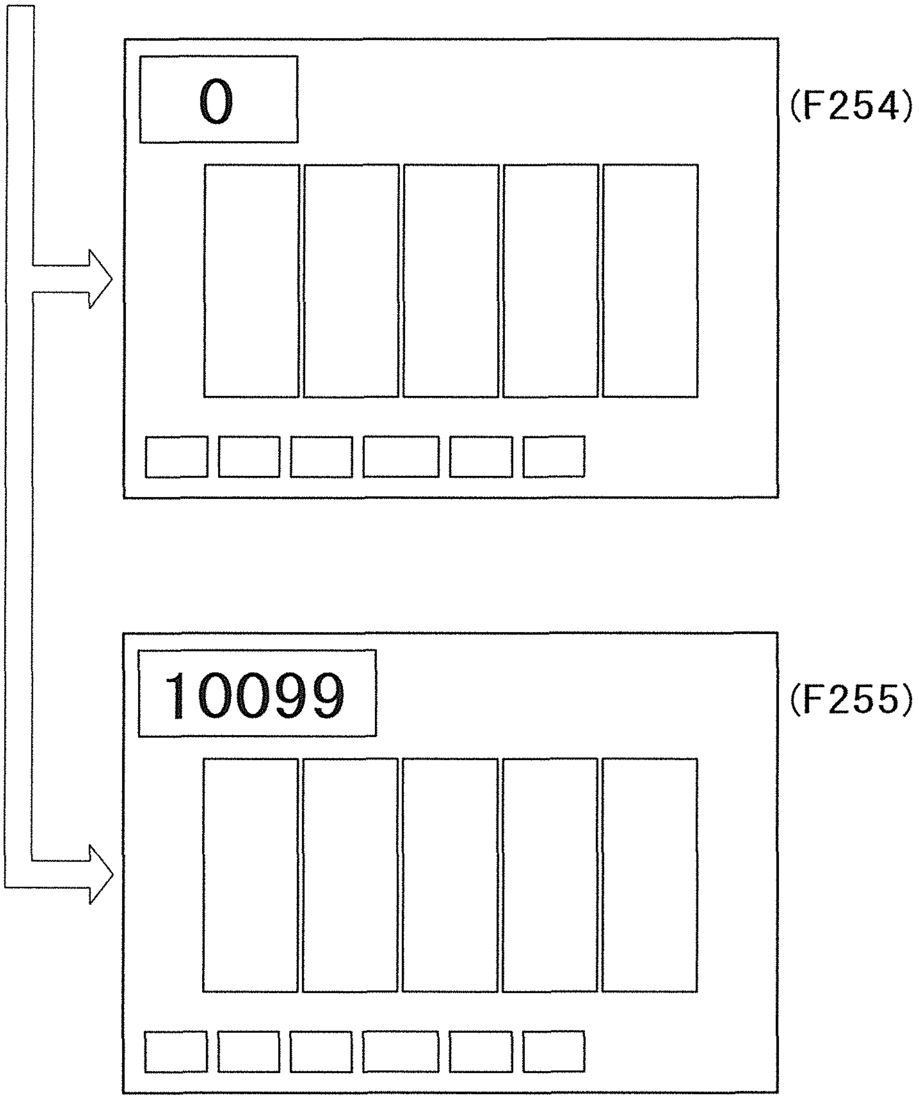
FIG. 34 illustrates operation steps of the gamble game.

Subsequently, as shown in FIG. 34, the amount bet on “GAMBLE AMOUNT” is displayed. Then one of the heart-shaped red button, the spade-shaped black button, and the TAKE WIN button at the center on the gamble screen is selected. When the TAKE WIN button is selected, the amount of WIN is added to the credits at once and the idle state comes back.

Figure 35:
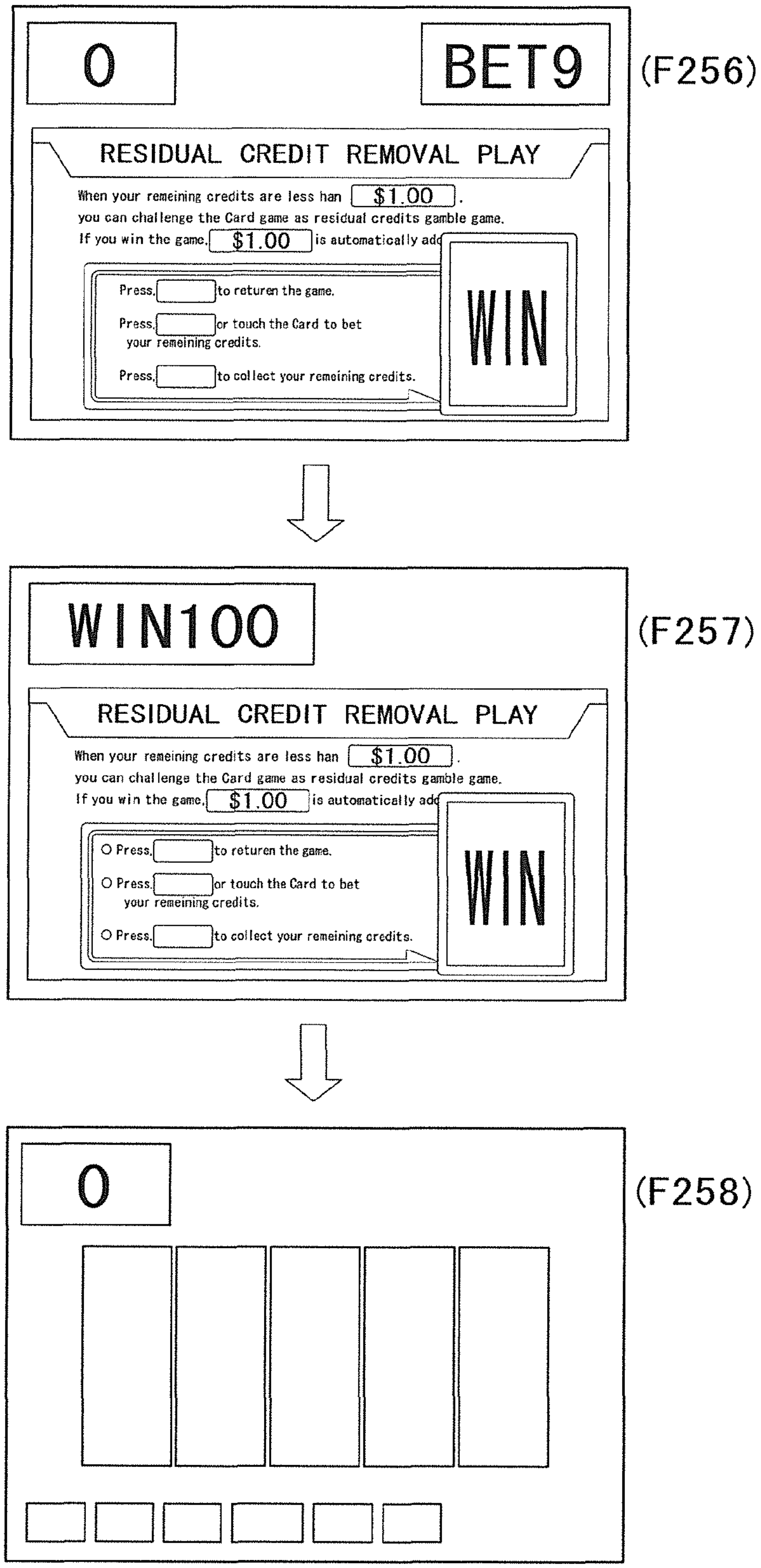
FIG. 35 illustrates operation steps of the gamble game.

In case of Miss in Gamble, as shown in FIG. 35, non-selected options are darkened. At the left edge of the gamble history field, the card history is displayed at once. The preceding card history moves right. The trace of the movement is not illustrated in animation, and hence the history is rewritten at once. The central card result is displayed at once. At this stage, there are no changes in the win meter and the gamble meter. Sound indicating hard luck is output and the shifting to the normal game occurs after several seconds.

In case of Success in Gamble, as shown in FIG. 36, non-selected options are darkened. At the left edge of the gamble history field, the card history is displayed at once. The preceding card history moves right. The trace of the movement is not illustrated in animation, and hence the history is rewritten at once. On the central card, a normal card and a card with a WIN text are alternately displayed at intervals of one frame, and success sound is output for a predetermined time. To the win meter, the value increase as a result of Gamble is added at once. When the player plays the gamble game until reaching the maximum number to times, the value won is added to the credits at once and the idle state comes back. As shown in FIG. 194, when the player has not played the gamble game until reaching the maximum number to times, a card is turned inside out and the gamble game is continued.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. Although the present specification occasionally personifies the processes carried out in the steps or blocks, these processes are essentially executed by various devices. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a housing;

a plurality of input devices supported by the housing, the plurality of input devices including a value-addition mechanism by which gaming media associated with monetary value can be added to the gaming machine; a wager button; and a cash-out button;

a currency validator;

an award payout mechanism that pays out gaming media;

a symbol display device configured to variably display symbol arrays each including a plurality of normal symbols of various types and a plurality of blank symbols each arranged between the normal symbols, and then rearrange the normal symbols and the blank symbols in a symbol display region having a matrix of cells; and a controller, which, via the validator, identifies gaming media that has been added to the gaming machine; which establishes a credit balance for a player based at least in part on gaming media that has been added to the gaming machine; and which, as a result of a player having wagered gaming media, causes the normal symbols and the blank symbols to be rearranged;

wherein the controller generates a first prize when a first predetermined number or more of normal symbols of a first predetermined one of said various types are rearranged along a payline in the symbol display region, and when a second predetermined number or more of normal symbols of a second predetermined one of said various types are rearranged in the symbol display region irrespective of the payline, the controller generates a second prize lower than the first prize when a maximum number of the blank symbols that can possibly be displayed in the symbol display region, for the given configuration of the symbol arrays and the matrix of cells, are rearranged and displayed in the symbol display region irrespective of whether the blank symbols are displayed on any payline in the symbol display region.

2. The gaming machine according to claim 1, further comprising a game result display device configured to display a game result related to the first prize and the second prize, wherein when the first prize and the second prize simultaneously occur, the controller alternately repeats displaying of the first prize and displaying of the second prize.

* * * * *